(12) United States Patent
Tanimoto et al.

(10) Patent No.: US 6,862,543 B1
(45) Date of Patent: Mar. 1, 2005

(54) METHOD AND SYSTEM FOR ANALYZING DAMAGE OF PRODUCTS

(75) Inventors: Toshifumi Tanimoto, Saitama (JP); Takashi Nakamura, Fuchu (JP)

(73) Assignee: Sompo Japan Insurance Inc., Tokyo (JP)

( * ) Notice: Subject to any disclaimer, the term of this patent is extended or adjusted under 35 U.S.C. 154(b) by 0 days.

(21) Appl. No.: 10/169,594

(22) PCT Filed: Feb. 14, 2002

(86) PCT No.: PCT/JP00/06752

§ 371 (c)(1),
(2), (4) Date: Jul. 5, 2002

(87) PCT Pub. No.: WO02/12094

PCT Pub. Date: Feb. 14, 2002

(30) Foreign Application Priority Data

Aug. 2, 2000 (JP) ...................................... 2000-233960

(51) Int. Cl.[7] .............................................. B07C 5/34
(52) U.S. Cl. ....................................................... 702/84
(58) Field of Search ...................... 702/84, 183; 29/407; 358/302, 474; 250/306, 310, 223; 15/104; 271/227; 235/402; 73/41; 128/898; 380/85; 315/386; 209/582, 579, 565, 74

(56) References Cited

U.S. PATENT DOCUMENTS

| | | | | |
|---|---|---|---|---|
| 3,768,645 A | * | 10/1973 | Conway et al. | ............. 209/565 |
| 3,930,994 A | * | 1/1976 | Conway et al. | ............. 209/579 |
| 4,735,323 A | * | 4/1988 | Okada et al. | ............... 209/582 |
| 4,825,068 A | * | 4/1989 | Suzuki et al. | ........... 250/223 R |
| 5,841,893 A | | 11/1998 | Ishikawa et al. | |

FOREIGN PATENT DOCUMENTS

| | | |
|---|---|---|
| JP | 03044054 A | 2/1991 |
| JP | 05035745 A | 2/1993 |
| JP | 08090391 A | 4/1996 |
| JP | 09050949 A | 2/1997 |

* cited by examiner

Primary Examiner—John Barlow
Assistant Examiner—Tung Lau
(74) Attorney, Agent, or Firm—Workman Nydegger

(57) ABSTRACT

The cause of damage occurring in a distribution process is analyzed promptly and adequately. A damage status analyzing system (1) has a storage section (2) that stores damage information on cars including damaged position information, together with distribution attributes obtained during transportation, a damage status analyzing section (3) that analyzes the status of damage for each distribution attribute on the basis of the damage information, and a presentation section (4) that presents the results of the analysis. While determining damaged positions indicated by X and Y coordinates, damage information such as the type and level of damage and distribution attribute information obtained during transportation can be accumulated. In analyzing the tendency and characteristic of damage such as the status and position thereof in distribution processes, it is important to visually more precisely determine the status of the damage. Accordingly, the image status analyzing system (1) enables prompt and adequate determination.

28 Claims, 32 Drawing Sheets

| (0) PRODUCT NUMBER | (1) DAMAGED POSITION INFORMATION | (2) DAMAGE INFORMATION | (3) DISTRIBUTION ATTRIBUTES |
|---|---|---|---|

(1) DAMAGED POSITION INFORMATION
- DRAWING NUMBER
- X AND Y COORDINATES (2) DAMAGE INFORMATION (TYPE, LEVEL)

$X_1, Y_4$  SCRATCHED, ROUND, REPAIR, 5
$X_5, Y_2$  SCRATCHED, BOX, REPAIR, 3
⋮
$X_n, Y_n$  DAMAGE TYPE, DAMAGE SHAPE, DAMAGE LEVEL, DAMAGE SIZE (3) DISTRIBUTION ATTRIBUTES
- CAR TYPE NAME
- GRADE
- CHECKING ORGANIZATION
- CHECKED DATE AND TIME
- CHECKED LOCATION
- PLANT CODE
- MAKER CODE
- TROOPSHIP NAME
- LOADED POSITION IN SHIP
- TRANSPORTATION INSTRUMENT TYPE
- DEPARTURE PORT
- ARRIVAL PORT
- SHIP COMPANY NAME
- CARGO HANDLER NAME
- DEPARTURE DATE
- ARRIVAL DATE
- DATE OF CARGO HANDLING

METHOD AND SYSTEM FOR ANALYZING DAMAGE OF PRODUCTS

TECHNICAL FIELD

The present invention relates to a method and system for analyzing damage to products in a distribution process.

BACKGROUND ART

An important object of distribution operations is to "promptly" transport products while maintaining the "high quality" thereof. If any product is damaged during a distribution process, the cause of the image must be found as early as possible, and appropriate measures must be promptly taken therefor.

To examine and analyze the tendency and cause of damage during transportation, it is very important to be able to visually more precisely and freely check each attribute to determine which part of the product is frequently damaged and the like. However, the damage to the product is merely drawn on plain view as so-called image data, thereby hindering statistical processes from being easily executed as in the case with mathematical data. If a statistical process is executed, a very inefficient method must be carried out which comprises, for example, classifying each damaged position and manually drawing damaged points on a chart one by one.

Information on damage to products in a conventional distribution process has been analyzed by recording damage information on a sheet or a magnetic medium at a check point provided in the middle of or at the terminal of the distribution process and sending the recorded damage information to an analysis section. All data processed by statistical operations is figures for the quantity of damaged products, the number of occurrences, and the like as well as classification items generally representing damaged areas. A computer is used to classify, extract, and total data, but visual statistical analysis of the tendency of damage positions, which is very effective in analyzing the cause of the damage, must depend on manual classification and input of data. Accordingly, the visual statistical analysis requires a relatively large amount of work time and loads.

Corrective measures must be promptly taken for damage to products during a distribution process if it involves a particular problem. If such measures are not taken, the problem may spread immediately because a large amount of products are distributed everyday.

After precisely determining a damage occurrence location, the tendency and characteristic of damage must be promptly determined and analyzed. The conventional statistical method depending on figures and classification items representing damaged areas is not sufficiently precise. Further, analysis including visual elements requires an excessively large amount of time and labor, thereby hindering precise analysis data to be promptly produced.

It is an object of the present invention to provide a damage status analyzing method and system that can promptly and adequately analyze the cause of damage that may occur during a distribution process.

SUMMARY OF THE INVENTION

A damage status analyzing method according to the present invention is characterized in that product damage information including at least damaged position information is stored together with distribution attributes obtained during transportation so that a damage status is analyzed for each distribution attribute on the basis of damage information.

The damaged position information is preferably indicated as planar two-dimensional position coordinates by, for example, schematically representing products on a two-dimensional drawing such as a development. However, the present invention is not limited to this aspect. In any case, a damage status analyzing system identifies a particular damaged position indicated by an X and Y coordinates instead of a roughly determined position such as a door of a car. In connection with the damaged position, damage information such as the type and level of damage and distribution attribute information obtained during transportation are accumulated. To analyze the tendency and characteristic of damage such as the status and location thereof in distribution processes, it is important to visually more precisely determine what part of the product is frequently damaged and the like. Accordingly, the damage status analyzing system enables such matters to be determined promptly and adequately.

The distribution attributes are various factors constituting a distribution process and include those which are identified by, for example, the time when the damage check was conducted, the type of products to be transported, for example, if cars are transported, the particular type of the cars or their grade within an arbitrary type, and the location where the damage check was conducted and determination information for each transportation means, each transportation route, each transporter, each transportation facility, and each harbor cargo handler.

According to a first method, product damage information including at least damaged position information is stored together with distribution attributes obtained during transportation so that the status of the damage is analyzed for each distribution attribute on the basis of the damage information. Thus, the results of the analysis are presented to an analysis operator, thereby facilitating analysis of the cause of the damage to the product.

That is, with numerical data such as the quantity of damaged products and the number of occurrences as well as classification items generally representing damaged positions, which are processed in the conventional statistical operations, the tendency of the damage can be determined to some degree, but it is difficult to find the cause of the damage. With this method, damaged position information represented by the two-dimensional position coordinates of damage to a product is presented together with distribution attribute information such as time series information, check point information, and transporter information. If for example, cars are transported and if it is determined that most of the damage occurs in the neighborhood of the movable root of a front door during transportation, then it can be estimated that any transportation instrument may strike against this area to cause damage, thereby enabling the causes to be analyzed. Consequently, the tendency and characteristic of the damage such as the status and position thereof in distribution processes can be examined and analyzed promptly and adequately.

With a second method, product damage information including at least damaged position information is stored in accordance with time series so that during analysis, a variation in each damage along the time series is clarified to temporally analyze the occurrence of the damage.

With a third method, damage information is stored together with an item indicating the type of a product so that the status of damage to a particular area is analyzed for each product type on the basis of the damage information. By way of example, damage information is accumulated for each car type or each grade of a particular car type so that the damaged area and the type of the damage are analyzed for each car type or each grade, thereby enabling the causes and tendency of the damage to be analyzed.

With a fourth method, damage information is stored together with an item indicating a point (location) where the product was checked for damage so that the status of damage to a particular area is analyzed for each check location on the basis of the damage information. For example, if it is determined at a particular check point that a particular type of damage occurs in a particular area of a particular product, then it is determined that there is a problem with a particular product transporting method used before the check point is reached or the transporter's handling method.

With a fifth method, product damage information including at least damaged position information is stored together with at least one of the distribution attributes including transportation means, a transportation route, and a transporter so that the status of damage to a particular area is analyzed for each distribution attribute on the basis of the damage information. The cause of damage to a product can be easily analyzed on the basis of the damage information. For example, if it is determined that with a particular transportation means, a particular type of damage tends to occur in a particular area of a particular product, then this transportation means is the cause of the damage, and occurrence of damage can be controlled by properly changing this transportation means.

If the damage information includes the type and level of damage, the cause of the damage can be more precisely analyzed. For example, even if it is determined at the same check point that damage has occurred at the same position of products, the cause of the damage may vary depending on the type or level of the damage. Furthermore, determining the type and level of damage enables the determination of whether to take drastic or simple measures.

If the damaged position information is indicated by planar two-dimensional position coordinates, then damage information such as the type and level of damage and distribution attribute information obtained during transportation are accumulated in connection with the damaged position information. This enables prompt and adequate analysis of the tendency and characteristic of damage such as the status and position thereof in distribution processes, for which visually more precise determinations are important. In particular, for damage occurring within the distribution process, visual determination of which part of the product is damaged often allows the cause of the damage to be found.

An eighth to fourteenth arrangements relate to a system executing the above method.

The eighth arrangement corresponds to the first method, and the damage status analyzing system is characterized by comprising storage means for storing product damage information including at least damaged position information, together with distribution attributes obtained during transportation, damage status analyzing means for analyzing the status of the damage for each distribution attribute on the basis of the damage information, and presentation means for presenting results of the analysis.

The tendency of the damage can be estimated by combining one or more distribution attribute items, analyzing the damage status of the product, counting the number of products undergoing a particular type of damage, and analyzing the level of the damage. An analysis method including such an estimation method as a rule is preferably provided in the damage status analyzing means. The damage status analyzing means provided with such an analysis means analyses the damage status by using the analysis method to check damage information having damaged position information focusing on a particular position together with the corresponding distribution attributes. Thus, the cause of the damage can be determined more promptly and precisely than before. If the damage status analyzing means is provided with the analysis method as a rule, analysis of the cause of the damage, which has relied on a particular person's intuition, is carried out promptly and adequately.

The ninth arrangement corresponds to the second method, and the damage status analyzing system is characterized by comprising storage means for storing product damage information including at least damaged position information, in a time series manner, damage status analyzing means for clarifying a variation in each damage along the time series to temporally analyze the occurrence of the damage, and presentation means for presenting results of the analysis.

The tenth arrangement corresponds to the third method, and the damage status analyzing system is characterized by comprising storage means for storing product damage information including at least damaged position information, together with an item indicating the type of a product, damage status analyzing means for analyzing the status of damage for each product type on the basis of the damage information, and presentation means for presenting results of the analysis.

The eleventh arrangement corresponds to the fourth method, and the damage status analyzing system is characterized by comprising storage means for storing product damage information including at least damaged position information, together with an item indicating a location where the product was checked for damage, damage status analyzing means for analyzing the status of damage for each check location on the basis of the damage information, and presentation means for presenting results of the analysis.

The eleventh arrangement corresponds to the fourth method, and the damage status analyzing system is characterized by comprising storage means for storing product damage information including at least damaged position information, together with an item indicating at least one of the distribution attributes including transportation means, a transportation route, and a transporter, damage status analyzing means for analyzing the status of damage for each distribution attribute on the basis of the damage information, and presentation means for presenting results of the analysis.

The thirteenth arrangement corresponds to the sixth method and is characterized in that the damage information includes the type and level of damage.

The fourteenth arrangement corresponds to the seventh method and is characterized in that the damaged position information is indicated by planar two-dimensional position coordinates.

According to the fifteenth arrangement, it is proposed that any of the eighth to fourteenth damage status analyzing systems include a damage status input terminal that transfers the product damage information. A specific construction is characterized by further comprising an information transferring apparatus that transfers product damage information including at least damaged position information, together with distribution attributes obtained during transportation.

A sixteenth to twenty-third arrangements relate to a recording medium storing a program that can be executed by a computer in order to allow the computer to operate any of the eighth to fifteenth arrangements. That is, an arrangement that attains the above object is a recording medium storing a program that can be loaded and executed by a computer to implement the above described means using the computer. The computer may be a general-purpose computer including a central processing unit or a dedicated machine used for particular processes, and is not limited as long as it includes a central processing unit.

When the program that allows the computer to function as each of the above described means is loaded from the recording medium into the computer, the corresponding means defined in the eighth to fifteenth arrangements is implemented.

A specific sixteenth arrangement is a computer-readable recording medium having a program recorded thereon, the program allowing the computer to function as storage means for storing product damage information including at least damaged position information, together with distribution attributes obtained during transportation, damage status analyzing means for analyzing a the status of the damage for each distribution attribute on the basis of the damage information, and presentation means for presenting results of the analysis.

A specific seventeenth arrangement is a computer-readable recording medium having a program recorded thereon, the program allowing the computer to function as storage means for storing product damage information including at least damaged position information, in a time series manner, damage status analyzing means for clarifying a variation in each damage along the time series to temporally analyze the occurrence of the damage, and presentation means for presenting results of the analysis.

A specific eighteenth arrangement is a computer-readable recording medium having a program recorded thereon, the program allowing the computer to function as storage means for storing product damage information including at least damaged position information, together with an item indicating the type of a product, damage status analyzing means for analyzing the status of damage for each product type on the basis of the damage information, and presentation means for presenting results of the analysis.

A specific nineteenth arrangement is a computer-readable recording medium having a program recorded thereon, the program allowing the computer to function as storage means for storing product damage information including at least damaged position information, together with an item indicating a location where the product was checked for damage, damage status analyzing means for analyzing the status of damage for each check location on the basis of the damage information, and presentation means for presenting results of the analysis.

A specific twentieth arrangement is a computer-readable recording medium having a program recorded thereon, the program allowing the computer to function as storage means for storing product damage information including at least damaged position information, together with an item indicating at least one of the distribution attributes including transportation means, a transportation route, and a transporter, damage status analyzing means for analyzing the status of damage for each distribution attribute on the basis of the damage information, and presentation means for presenting results of the analysis.

A specific twenty-first arrangement is characterized in that the damage information includes the type and level of damage.

A specific twenty-second arrangement is characterized in that the damaged position information is indicated by planar two-dimensional position coordinates.

According to a twenty-third arrangement, a computer-readable recording medium is proposed which has a program recorded thereon, the program functioning as a damage status input terminal when executed by the computer. Its specific arrangement is a computer-readable recording medium having a program recorded thereon, the program allowing the computer to function as a damage status input terminal comprising an information transferring apparatus that transfers product damage information including at least damaged position information, together with distribution attributes obtained during transportation.

These recording media can be distributed as software products. Further, by operating any of the software products using existing hardware resources, the present invention can be easily executed on the existing hardware as a new application. It should be appreciated that in addition to these recording media, internal storage devices such as a RAM and a ROM and external storage devices such as a hard disk may be included in the recording medium defined by the present invention as long as they can have the program recorded thereon.

Some of the functions of the means of the sixteenth to twenty-third arrangements may be incorporated in the computer as hardware or may be implemented by an operating system or another application program incorporated in the computer. The program recorded on the recording medium may contain commands that invokes functions executed by the computer or causes such functions to be linked.

Some of the means defined in the eighth to fifteenth arrangements may be replaced with corresponding ones of the functions executed, for example, by the operating system. That is, the recording medium does not have programs or modules directly recorded thereon which implement these functions, but substantially the same effects can be produced by invoking the corresponding functions of the operating system, which can achieve these functions, or causing the functions to be linked.

According to a twenty-fourth to thirty-first arrangements, a computer program that achieves the same functions as those of the program recorded on the recording medium according to any of the sixteenth to twenty-third arrangements is proposed separately from the recording medium.

A specific twenty-fourth arrangement is a computer program product allowing the computer to function as storage means for storing product damage information including at least damaged position information, together with distribution attributes obtained during transportation, damage status analyzing means for analyzing a the status of the damage for each distribution attribute on the basis of the damage information, and presentation means for presenting results of the analysis.

A specific twenty-fifth arrangement is a computer program product allowing the computer to function as storage means for storing product damage information including at least damaged position information, in a time series manner, damage status analyzing means for clarifying a variation in each damage along the time series to temporally analyze the occurrence of the damage, and presentation means for presenting results of the analysis.

A specific twenty-sixth arrangement is a computer program product allowing the computer to function as storage means for storing product damage information including at least damaged position information, together with an item indicating the type of a product, damage status analyzing means for analyzing the status of damage for each product type on the basis of the damage information, and presentation means for presenting results of the analysis.

A specific twenty-seventh arrangement is a computer program product allowing the computer to function as storage means for storing product damage information including at least damaged position information, together with an item indicating a location where the product was checked for damage, damage status analyzing means for analyzing the status of damage for each check location on the basis of the damage information, and presentation means for presenting results of the analysis.

A specific twenty-eighth arrangement is a computer program product allowing the computer to function as storage means for storing product damage information including at least damaged position information, together with an item indicating at least one of the distribution attributes including transportation means, a transportation route, and a transporter, damage status analyzing means for analyzing the status of damage for each distribution attribute on the basis of the damage information, and presentation means for presenting results of the analysis.

A twenty-ninth computer program product is characterized in that the damage information includes the type and level of damage.

A thirtieth computer program product is characterized in that the damaged position information is indicated by planar two-dimensional position coordinates.

According to a thirty-first arrangement, a computer-readable recording medium is proposed which has a program recorded thereon, the program functioning as a damage status input terminal when executed by the computer. Its specific arrangement is a computer program product allowing the computer to function as a damage status input terminal comprising an information transferring apparatus that transfers product damage information including at least damaged position information, together with distribution attributes obtained during transportation.

BRIEF DESCRIPTION OF THE DRAWINGS

FIG. 3 is a view showing a data structure composed of damage information on a car including damaged position information and distribution attribute information obtained during transportation;

BEST MODE FOR CARRYING OUT THE INVENTION

Embodiments of the present invention will be described below.

(Embodiment 1)

Figure 1:
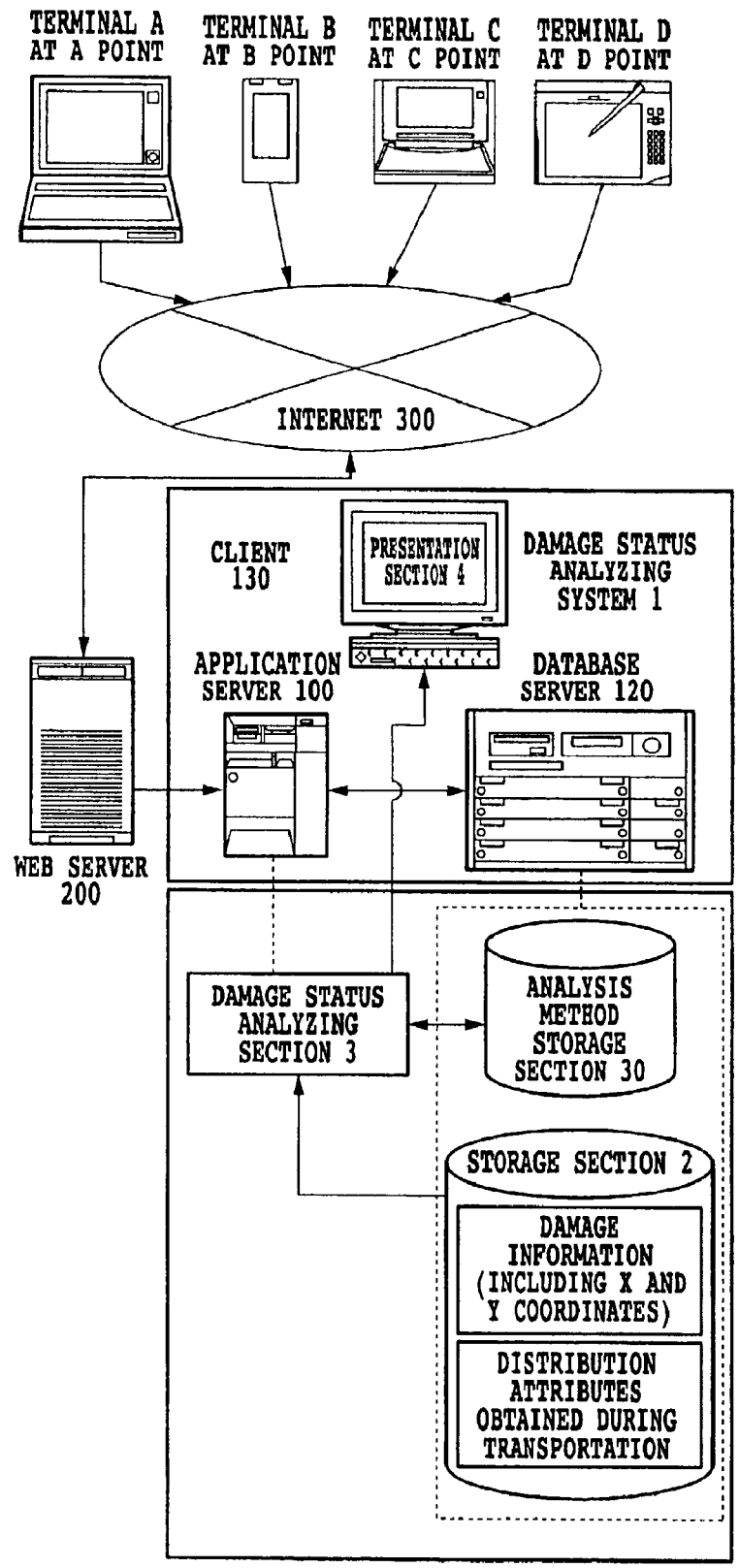
FIG. 1 is a view showing the configuration of the entire damage status analyzing system that analyzes the status of damage.

FIG. 1 shows the configuration of a damage status analyzing system that analyzes the status of damage. If a plurality of cars are transported in cargoes from a location A to a location D, the status of damage in the cargoes is checked at each location. The results of the checks are sent from a plurality of terminals A to D to a damage status analyzing system 1 via the Internet 300. Then, the system 1 analyzes the status of damage.

Figure 5:
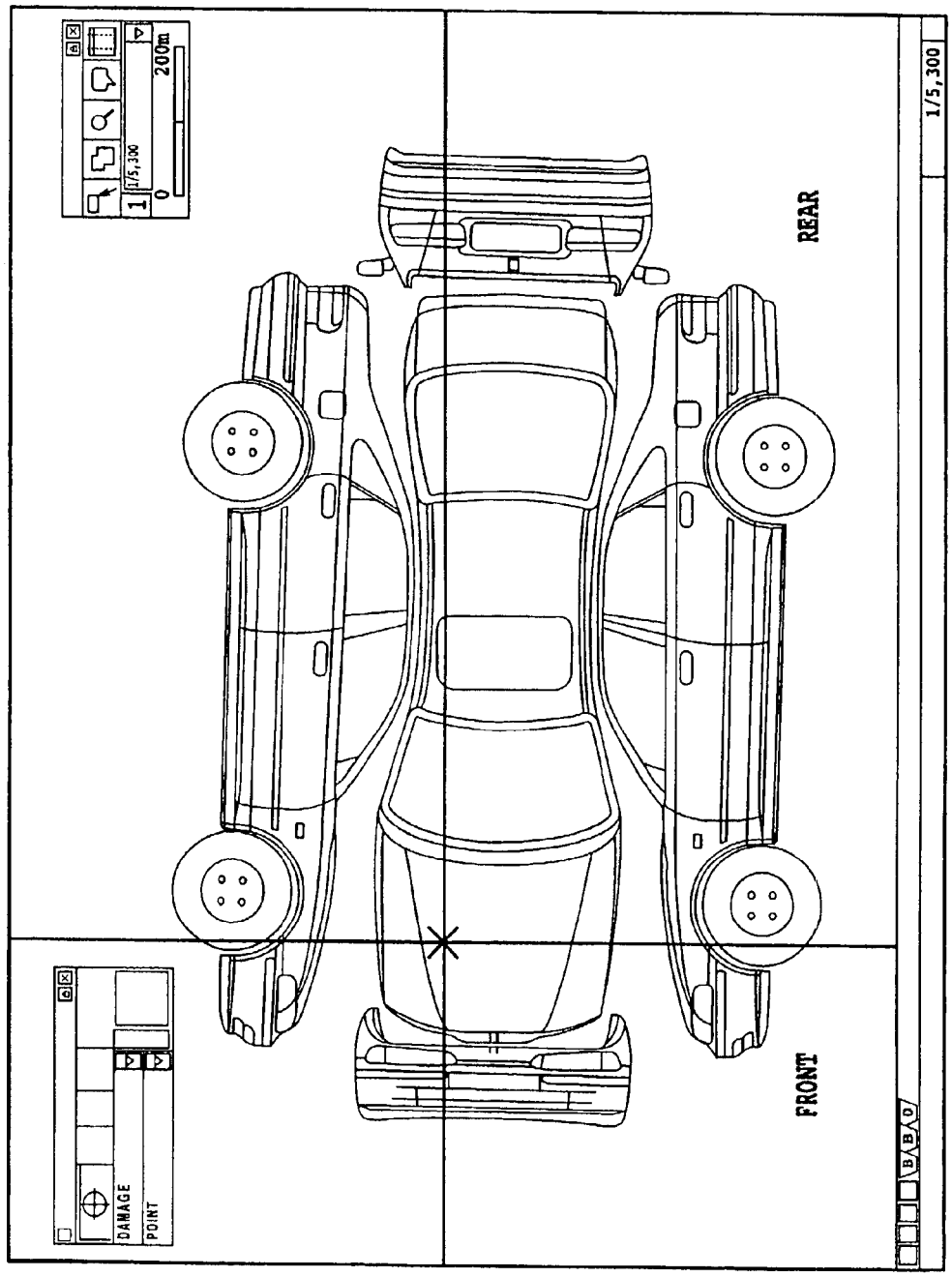
FIG. 5 is a view showing an input screen displayed if damaged position information is input at a terminal.

As shown in FIG. 1, operators conducting checks at these locations each use the terminal A, B. C, or D such as a personal computer to point a damaged area on a development of a car to be checked as shown in FIG. 5 (in this figure, a cross is used to indicate the damaged area). Furthermore, the operator checking the car inputs damage information such as the type and level of the damage and distribution attributes such as a name of a checking organization, a checked date and time, and a checked location. The input data is provided with security and then sent to a Web server 200 of the damage status analyzing system 1 via the Internet 300.

The Web server 200 identifies the operator of the terminal that has transferred the data, then clears the security provided for the transferred data, and subsequently delivers the data to an application server 100 constituting the damage status analyzing system 1.

Instead of using the Internet 300 as shown in FIG. 1, the data may be saved to a magnetic recording medium, which is then transported and delivered to the damage status analyzing system 1. Alternatively, a plan view drawn on paper and illustrating the occurrence of damage may be sent from a check point. On the basis of this plan view, directly from a client 130, the damaged area may be pointed (in the figure, a cross is used to indicate this area), and other damage information such as the type and level of the damage and distribution attributes such as a name of a checking organization, a checked date and time, and a checked location may then be input to save these data.

The damage status analyzing system 1 analyzes the status of the damage on the basis of the accumulated data, and displays the results of the analysis on a screen of the client 130 connected to the application server 100.

Figure 2:
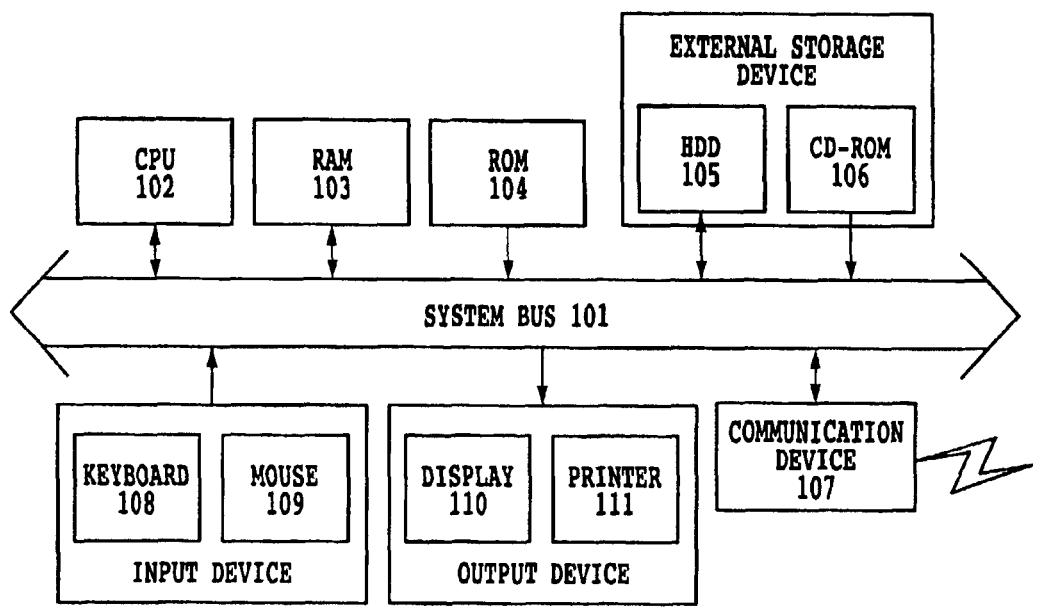
FIG. 2 is a block diagram showing the configuration of apparatuses including an application server 100, a database server 120, and a client 130.

FIG. 2 shows the construction of apparatuses including the application server 100, a database server 120, and the client 130 connected to the application server 100, all of which constitute the damage status analyzing system 1.

Each of these apparatuses comprises a CPU 102, internal storage devices such as a RAM 103 and a ROM 104, external storage devices such as a hard disk drive 105 and a CD-ROM driver 106, a particular communication device 107 composed of an adapter to which a dedicated line to the Internet is connected, input devices such as a keyboard 108 and a mouse 109, and output devices such as a display 110 and a printer 111, all of which are connected together via a system bus 101. The system bus 101 allows required data and commands to be communicated between these devices. Further, if the Web server 200 or terminal is composed of a general-purpose computer, it has the same configuration and thus its detailed description is omitted.

The damage status analyzing system 1 is constructed on the application server 100, database server 120, and client 130, and has a storage section 2, a damage status analyzing section 3, and a presentation section 4, as shown in FIG. 1.

The storage section 2 is composed of the hard disk drive 105 of the database server 120 to store damage information on cars including at least damaged position information, together with distribution attributes obtained during transportation. The stored information will be described later.

The damage status analyzing section 3 is composed of the CPU 102 of the application server 100 and the RAM 103 thereof, which provides a working area. An analysis method storage section 30 composed of the hard disk drive 105 of the database server 120 provides an analysis method for the damage status analyzing section 3. The damage status analyzing section 3 has the function of analyzing the status of damage for each distribution attribute on the basis of the damage information.

The analysis method stored in the analysis method storage section 30 analyzes the tendency of damage by taking out one or more arbitrary distribution attributes, rearranges the damage information and the other distribution attributes relative to the taken-out attributes, and counting the number of flaws concentrating at a particular position in a two-dimensional position coordinate system. If for example, cars of the same type are divided into groups of cargoes, which are then transported during different operations, then damage information is extracted for each group of cargoes taken out from the distribution attributes. The status of damage to the cars in each cargo group at each location is compared and analyzed. For the comparison and analysis, the data is rearranged in accordance with the time series, and the status of the same car type at the same location is compared for each part of the time series.

For such analysis, roughly two methods are desirably employed. One of the methods is to use initially fixed conditions to check whether or not damage has occurred under these conditions. The other is to formulate various hypotheses, extract data while varying the conditions, rearrange the data, and determine whether or not there is an unexpected significant data tendency. That is, this method presents only the particular condition with a significant tendency when the results are arranged.

The presentation section 4 is composed of the display 110 of the client 130 and have the function of presenting the results of analysis. Although the presentation section 4 is composed of the client 130, it may be composed of the display (not shown) installed in the application server 100.

FIG. 3 shows a data structure composed of damage information on a car including damaged position information as well as distribution attribute information obtained during transportation, both sets of information corresponding to the results of checks stored in the storage section 2.

The data structure includes a (0) product number, that is, the body number of each car to be checked, the drawing number of a development of the car to be checked, and damaged position information composed of an X and Y coordinates indicative of each damaged position in the development. Damage information indicative of the type, shape, level, and the like of the damage at each damaged position is stored together with the X and Y coordinates. The figure illustrates the type, shape, level, size, and other factors of damage. The data structure further includes distribution attributes obtained during transportation. In the figure, the distribution attributes include a name of a car type, a grade, a name of a checking organization, a checked date and time, a checked location, a plant code, a maker code, the name of a troopship, a loaded position within the ship, the type of a transportation instrument, a departure port, an arrival port, the name of a ship company, the name of a cargo handler, a departure date, an arrival date, the date of cargo handling, and other pieces of information.

Figure 4:
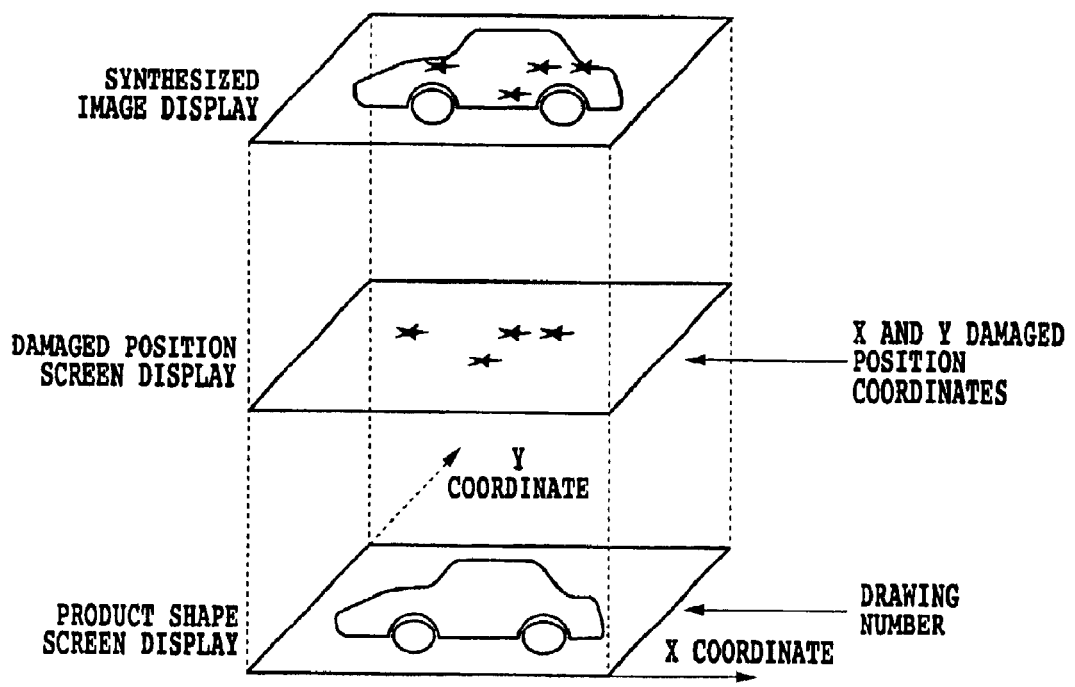
FIG. 4 is a perspective view showing a method of synthesizing, on a screen, a development of a car type to be checked and damaged position information indicated by an X and Y coordinates.

FIG. 4 shows a method of synthesizing a development of a car type to be checked and damaged position information indicated by an X and Y coordinates. The synthesized screen is displayed on the presentation section 4 to allow an operator to visually confirm the damaged position. By specifying arbitrary classification and extraction conditions on the basis of the distribution attribute information, a tendency indicating which part of a checked car is frequently damaged or the like can be determined. Further, the damaged position can be visually determined within a short time viewing the various status of damage under many and various classification and extraction conditions.

Figure 6:
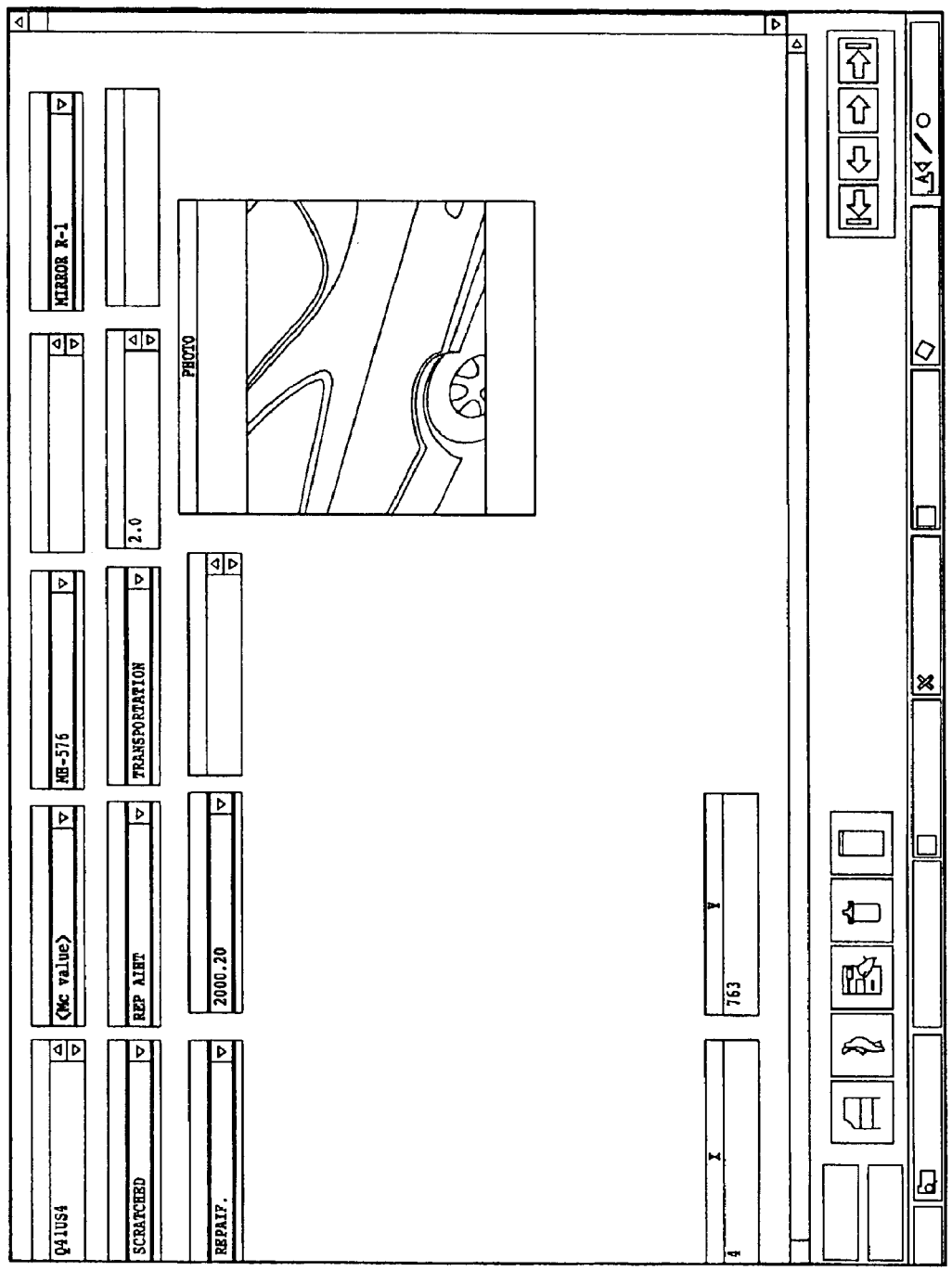
FIG. 6 is a view showing a screen on which damage information is input.

FIG. 5 shows an input screen displayed if damaged position information and the type, level, and other factors of damage are input at, for example, a terminal A. When a damaged position is clicked on the development of the checked car type using a cursor, X and Y coordinate data on the development shown on the screen is obtained. The coordinate data is stored in the storage section 2 as damaged position information data. At this time, the input screen shown in FIG. 6 is presented, and damage information such as the type and level of the damage is input.

These pieces of information are input for all of the damage to the target car. If there are a plurality of cars, the input operation is performed for predetermined ones of them. This operation may be performed for all the cars or only some of them which are extracted at certain intervals or at random. Subsequently, distribution attributes such as those shown in FIG. 3 are input.

Figure 7:
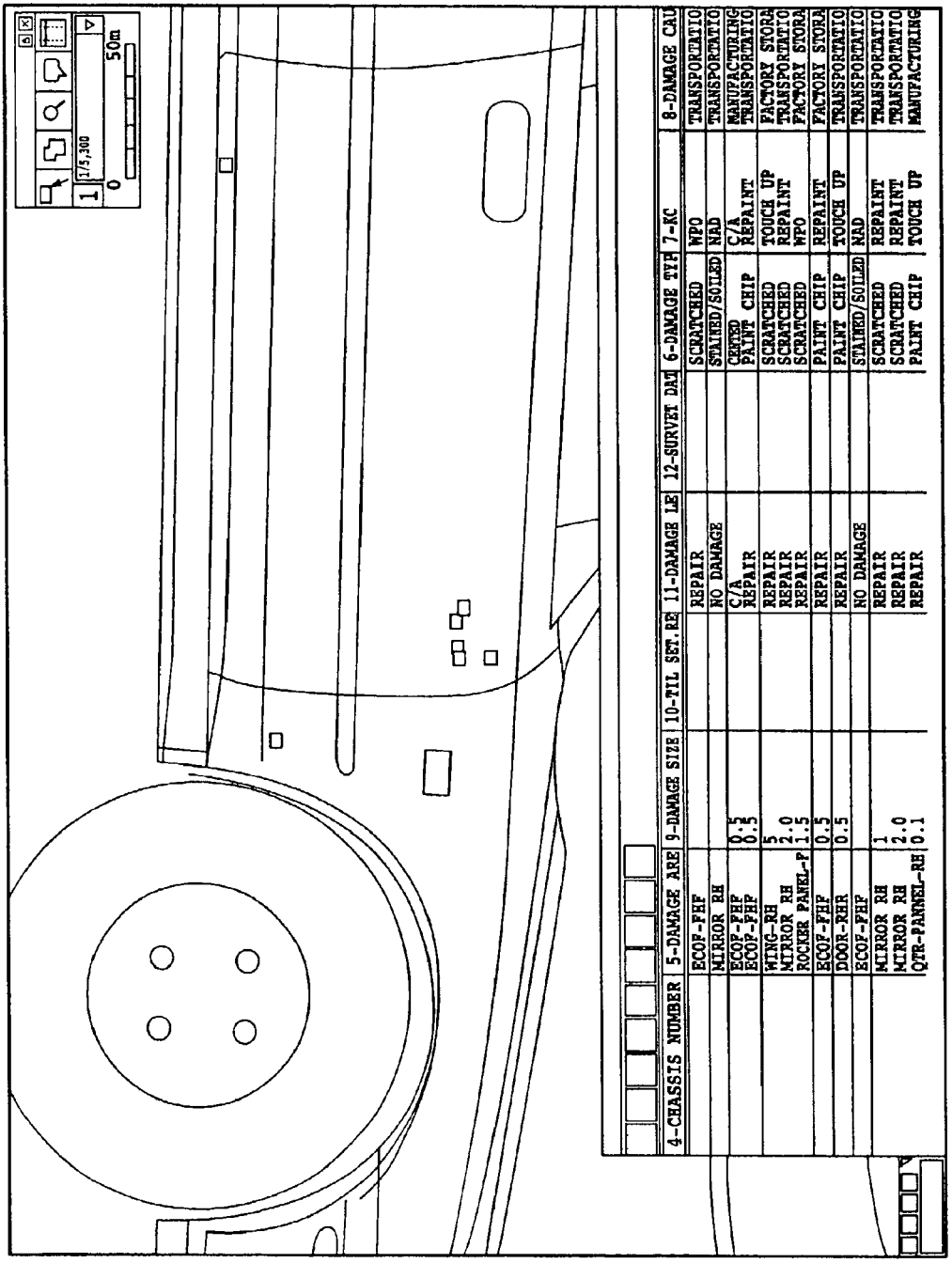
FIG. 7 is a view showing a screen displaying, in a presentation section 4, damage information with damaged position information stored in a storage section 2, together with an enlarged development of a car type to be checked.

FIG. 7 shows a screen displaying, in the presentation section 4, damage information with damaged position information stored in the storage section 2, together with an enlarged development of a car type to be checked. Information on damaged areas marked with stars on the development is inverted on a spread sheet.

Figure 8:
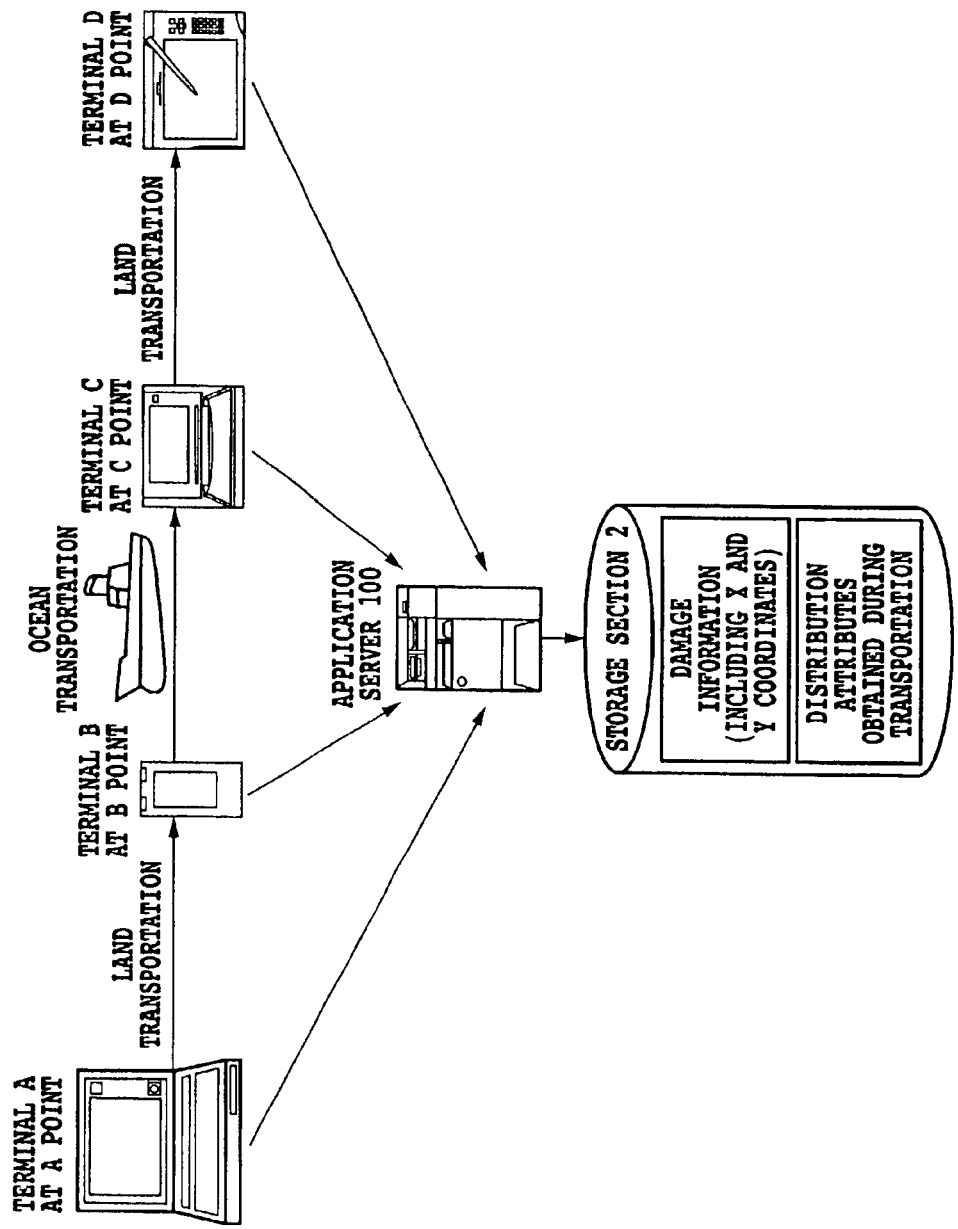
FIG. 8 is a view showing that the results of checks on a car damage status carried out at certain points are collectively stored in the storage section.

FIG. 8 shows that the results of checks on a car damage status carried out at certain points are collectively stored in the storage section 2. This figure shows the case in which several hundreds of card are transported from a location A to a location B by land, then to a location C by sea, and subsequently to a location D by land again.

The same target is checked in a time series manner or at each check point so that the results of the checks are accumulated in the storage section 2 of the damage status analyzing system 1. When the damage status analyzing section 3 processes the accumulated results of the checks, when and where the damage has occurred and which part of the car has been damaged can be determined in detail from the distribution attribute information. Furthermore, distribution attributes such as the name of a ship, a loaded position within the ship, the type of a transportation instrument, the name of a ship company, and the name of a cargo handler as well as damage information such as the type and level of the damage are specified separately or in combination as classification and extraction conditions for the damaged position. In this manner, the causal relationship with the damage, e.g. which part of the car is prone to undergo the damage under certain conditions can be determined for each distribution attribute in detail, thereby enabling the cause of the damage to be determined or estimated.

Figure 9:
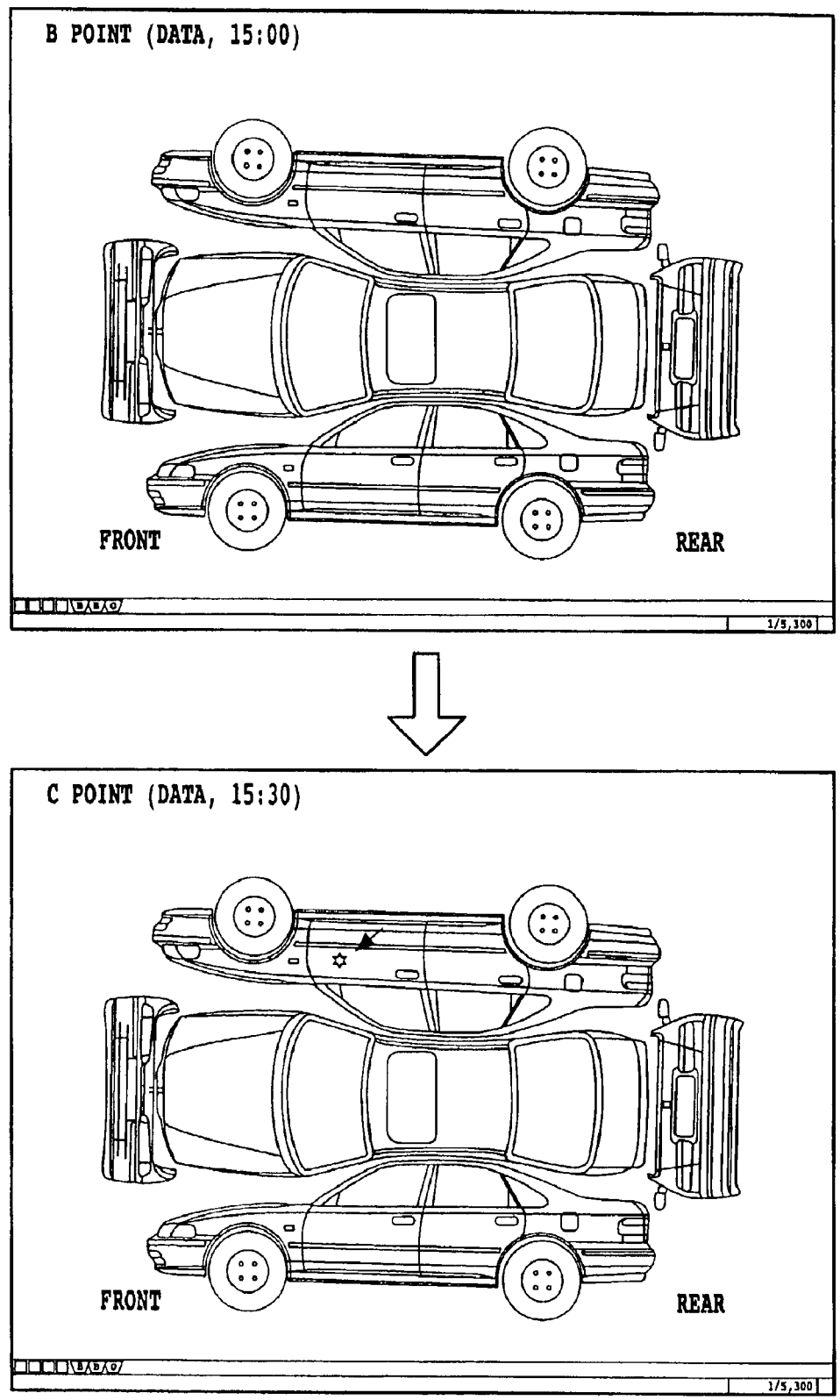
FIG. 9 is a view showing positional information on damage discovered at a point C when a car with the same body number were checked at points B and C.

FIG. 9 shows positional information on damage discovered at a point C when a car with the same body number were checked at points B and C. FIG. 9 indicates that a right door position was damaged during loading, ocean shipping, or unloading. Furthermore, for example, distribution attributes such as the name of a ship, a loaded position within the ship, the type of a transportation instrument, the name of a ship company, and the name of a cargo handler as well as damage information such as the type and level of the damage are specified separately or in combination as classification and extraction conditions for the damaged position for display. As a result, which part of the car is prone to undergo the damage under certain conditions can be determined, or information useful in estimating the cause of the damage can be obtained from the distribution attributes.

Damage information including damaged position information is presented on the screen, and the damage status analyzing section 3 uses the various conditions in the distribution attribute information separately or in combination to provide classified and extracted damaged position information. Consequently, the status of the damage can be analyzed more closely than in the prior art within a very short time. The presentation section 4 provides the results of such damage status analysis for an operator analyzing the status, so that the analysis operator can precisely analyze the cause of the damage. For the above-described method, the damage status analyzing section 3 draws out an appropriate one from the analysis method storage section 30 for execution as required.

For example, if damage information has been accumulated for many other cars transported simultaneously, it is estimated that this damage has been caused by the transporter or cargo handler or the transportation instrument used during transportation.

Furthermore, if cars of the same type divided into groups that are transported during different operations and if damage is found at the same position of the cars loaded at the same position of the ships, it is estimated that the loading of the cars in the ship has a problem.

There has been no conventional mechanism for closely identifying the damaged area and instantaneously displaying the attribute conditions under separate conditions or a combination of the conditions. Therefore, this point is the greatest characteristic of the present invention.

Specific examples of the above analysis method will be described below.

(Rule of Estimation for the Cause of Damage Confirmed on a Two-dimensional Plan View (damage to cars))

To use the damage status analyzing system 1 used to check cars for damage, determine the tendency of the damage on a two-dimensional plan view to clarify the cause thereof, the following analysis process and functions are executed:

First, damage information is checked, and basic elements required to analyze the status of damage, i.e. temporal and locational attribute information and conditions are input to the computer. On the basis of the time-series and locational transitions of distribution, the damage status analyzing system shows when and where the damage occurred by arranging the data according to the conditions. This automatically provides the locational and temporal elements of the damage, which are basic check items.

Second, distribution attribute information and conditions such as the type of products, a harbor cargo handler and a handling method, a route, and the type of a transportation instrument are input to the computer, and the damage status analyzing system 1 arranges and displays these data. In addition to the temporal and locational elements, more detailed information, that is, other distribution attribute factors concerning the damage can be verified. If a peculiar damage tendency occurs in particular environments and under particular conditions, distribution environment factors concerning these damage and attribute factors common to the damage are derived.

As a third step, the cause of damage to the surface of a vehicle is somewhat unique to its occurrence position. The present system uses the computer to precisely and promptly arrange and display the bias status of damaged positions on a two-dimensional plan view. Consequently, the most probable damage factors can be derived by comprehensive examinations based on the results of the analysis in the first and second step. This is useful in promptly discussing and planning future damage prevention measures and carrying out the planned measures as early as possible.

The first to third steps need not necessarily be executed in this order, but the damage factors can be determined by executing the three steps in an arbitrary order.

An explanation will be given of several specific standard examples of the rule for the causal relationship between damaged areas and the causes of the damage, described in the third step. After arrangement and extraction of data has been carried out on the basis of the distribution attribute conditions input to the computer, the tendency of the status of damage is arranged and displayed on a two-dimensional drawing together with precise positional information on damaged areas. A mechanism for easily deriving factors concerning the cause of the damage and promptly finding and correcting the cause will be easily described using a model that simplifies actual operations to some degree.

With conventional check and analysis methods, data including such attribute information is checked, and every damaged position is manually marked on a plan view. It is virtually difficult due to a large amount of associated burdens to manually accumulate a large amount of data, switch a combination of cutaway views and conditions, and analyzes and displays the appearance of damaged points.

(Standard Rule for Analysis for Vehicle Damage Checks)

First, the status of damage is checked and recorded at two points in a car transporting process. For each transportation section, information on a plurality of cargo handlers engaged in transportation and information on the name of a car type and the type and level of damage are added as data and input to the damage status analyzing system 1 together with positional information.

(Case 1)

Statistical analysis executed by the damage status analyzing system 1 indicates that in a certain transportation section, more scratches occurred close to a door handle or a keyhole on the driver side.

(Derived Estimated Cause)

It has been confirmed that the reason why a large number of scratches on the driver side door are found close to the door handle or keyhole rather than being irregularly distributed in all directions is that a cargo handler violently opens and closes the door. If it is determined that particularly many scratches occurred during cargo handling carried out by the cargo handler in charge of the displayed transportation section, this cargo handler must be notice of the need to improve its handling method. Since a large amount of products are transported everyday, it is important to more promptly find the cause of damage and notice the corresponding operator of the cause, in order to effectively prevent similar damage. With mere information indicating that the "driver side door is damaged in three areas" or the like, as in the prior art, it is difficult to estimate the cause of the damage.

(Case 2)

The same checks conducted by the damage status analyzing system 1 indicate that many scratches occurred in the front and rear doors of the car and in the lower part of the fender.

(Derived Estimated Cause)

Most of damage occurring in the lower part of the door, specifically, an area located several tens of centimeters from the ground, during a particular section results from the bad condition of the ground of a wharf, on which the car must run and may splash pebbles or sand. The road surface of the wharf in the corresponding section should be checked to take corrective measures such as improvement of the road surface and limitation of running speed. If the damage concentrates on either the right or left door, the cause may be that the car is placed outdoors over a long period and exposed to a blow of sand or gravel due to strong winds. Alternatively, pebbles splashed by other cars may have struck against this car. With mere information indicating that the "driver side door is damaged in three areas" or the like, as in the prior art, it is difficult to estimate the cause of the damage.

(Case 3)

Statistical analysis carried out by the damage status analyzing system 1 indicates that a large number of scratches have occurred at the opposite ends of the bumper of the car.

(Derived Estimated Cause)

If data is accumulated in and analyzed by the damage status analyzing system 1 to determine that a large number of scratches have occurred close to the opposite ends of the bumper, then it is likely that a fixture or lashing material used to tie the ship to the floor of a hold was inappropriately handled. The handling of the fixture or lashing material in this section must be corrected.

If the scratches are scattered over the surface of the bumper and similar scratches are also scattered over a part of the body close to the bumper, then the car may have splashed gravel under bad rod surface conditions. With mere information indicating that the "driver side door is damaged in three areas" or the like, as in the prior art, it is difficult to estimate the cause of the damage.

(Case 4)

Statistical analysis carried out by the damage status analyzing system 1 indicates that a large number of contamination losses and flaws have occurred at the right and left ends of the ceiling portion of the car.

(Derived Estimated Cause)

If the dirty areas are uniformly distributed over the ceiling, then it is likely that flying dirt may have stuck to the car while it was placed outdoors. If the dirty areas or flaws are present only at the right and/or left end of the ceiling, then it is likely that this damage results from acts of operators such as the placement of operators' hands or dirty portable instruments at this position during cargo handling. Accordingly, the cargo handling method in this section must be corrected.

(Case 5)

Statistical analysis carried out by the damage status analyzing system 1 indicates that scratches are present between the ground and a fixed height in various areas including the door, fender, and right and left panel portions of the car. In this case, two estimated causes are derived.

(Derived Estimated Cause)

One of the estimated causes is that when operators pass by the car in a temporary storage site, belt fixtures, watches, or the like which are worn by the operators against a work clothe manual often come in contact with the car body to cause damage. The actual situation of the cargo handling in the section in which a large number of such scratches are found must be closely examined, verified, and corrected.

The other cause may be that a transportation section including a self-running section has a very narrow portion, where the car comes in contact with protrusions present therein. The facilities in the transportation process must be checked and improved.

(Case 6)

Statistical analysis carried out by the damage status analyzing system 1 indicates that a large number of scratches are found in the same area of the same car type regardless of the transportation section, transportation instrument, or cargo handler.

(Derived Estimated Cause)

It is likely that the transportation process has no problem but that the manufacture process of the plant is problematic with damage occurring on a production line. The products must be checked for damage before being shipped from the plant so that this damage can be strictly distinguished from damage occurring during the transportation process to determine the cause thereof on the plant production line.

As described above, the damage status analyzing system 1 carries out time-series and locational tendency analysis of damage and tendency analysis of distribution attribute information and damaged positions on a plan view. The cause of the damage, which is difficult to promptly find with the conventional method, can be easily determined from the results of these analysis processes.

The present invention provides not only a close damage check method but also a very effective support mechanism for consulting and negotiating with related people to reduce or prevent distribution damage from occurring during the manufacture or transportation process. This is because those engaged in the transportation process tend to avoid admitting that damage has occurred in their responsible section and because they are prone to treat damage, if any, as an "accidental occurrence". The damage status analyzing system 1 can present materials, together with the corresponding drawing, indicating that damage tends to occur evidently regularly only in the responsible section. This is more persuasive and is likely to facilitate discussion on appropriate corrective measures between the related parties.

If an enormous amount of data is used, the damage status analyzing system 1 is constructed as a distributed processing system comprising the application server 100, the database server 120, and the client 130. A standalone configuration of a personal computer can also be used.

After clearing the security, the check data accumulated in the Web server 200 can be downloaded into the client 130 for analysis as required. The client 130 is a damage status analyzing system constituted by operating an application mounted in the client 130.

(Embodiment 2)

Figure 10:
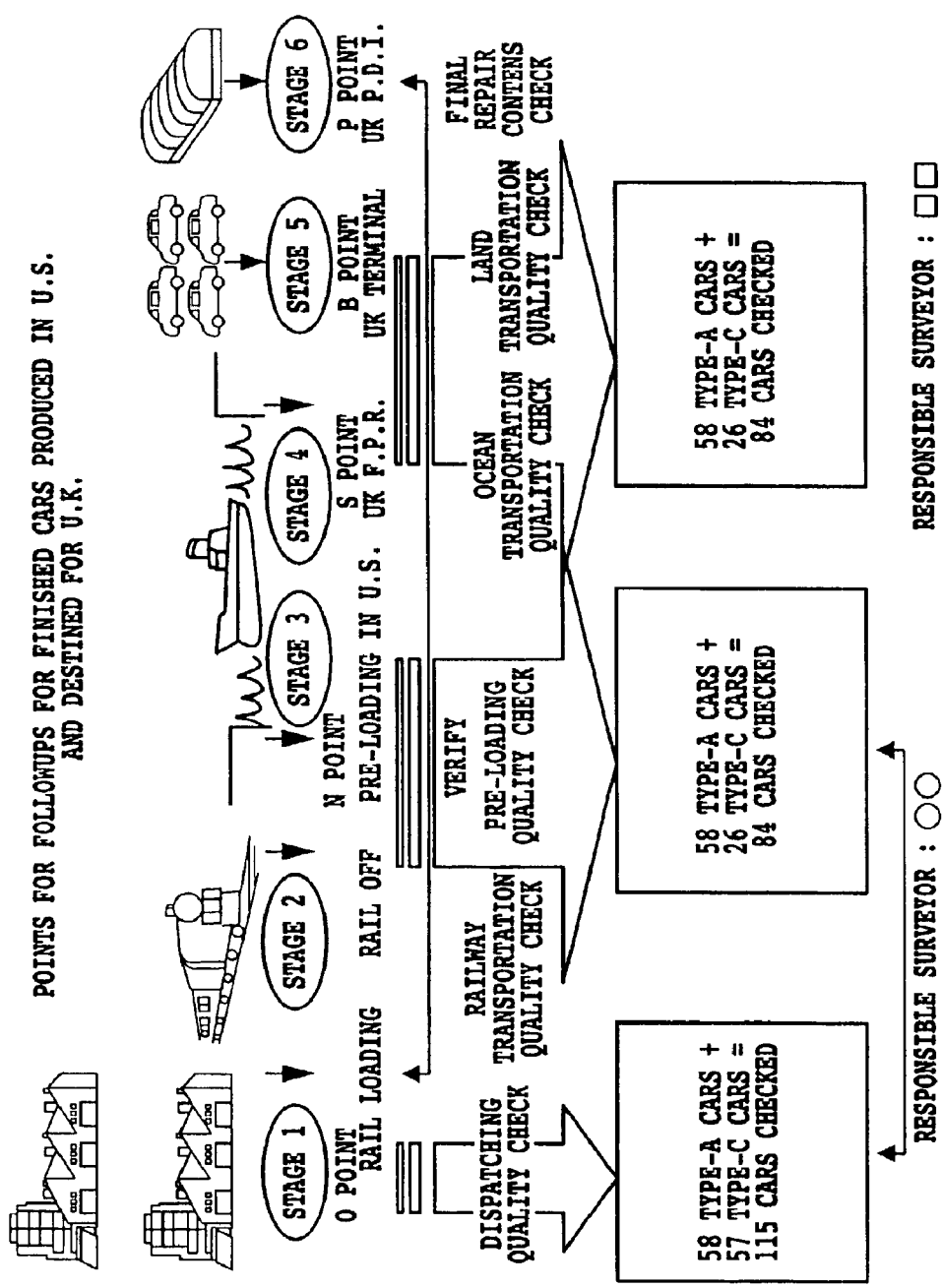
FIG. 10 is a view schematically showing analysis of the status of damage using the damage status analyzing system, in accordance with time series.

FIG. 10 schematically shows analysis of the status of damage carried out using the damage status analyzing system, in accordance with time series if cars produced in the U.S. are exported to the U.K.

In Embodiment 2, dispatching quality was checked at the location 0 of a plant, railway transportation quality was checked after railway transportation, and a pre-loading check was conducted at a location N in the U.S. Then, ocean transportation quality was checked at a location S in the U.K. where the cargoes were unloaded, land transportation quality was checked at a location B in the U.K. after railway transportation, and the contents of repairs were finally checked at a location P in the U.K., that is, the destination.

The results of these checks were accumulated in the damage status analyzing system 1 to analyze the status of damage.

During the dispatching quality check, 115 cars of a certain type were checked including 58 TYPE-A grade cars and 57 TYPE-C grade cars. During the pre-loading quality check, the same surveyor checked 84 cars including 58 TYPE-A grade cars and 26 TYPE-C grade cars. During the ocean transportation quality check, another surveyor checked 84 cars including 58 TYPE-A grade cars and 26 TYPE-C grade cars.

Figure 11:
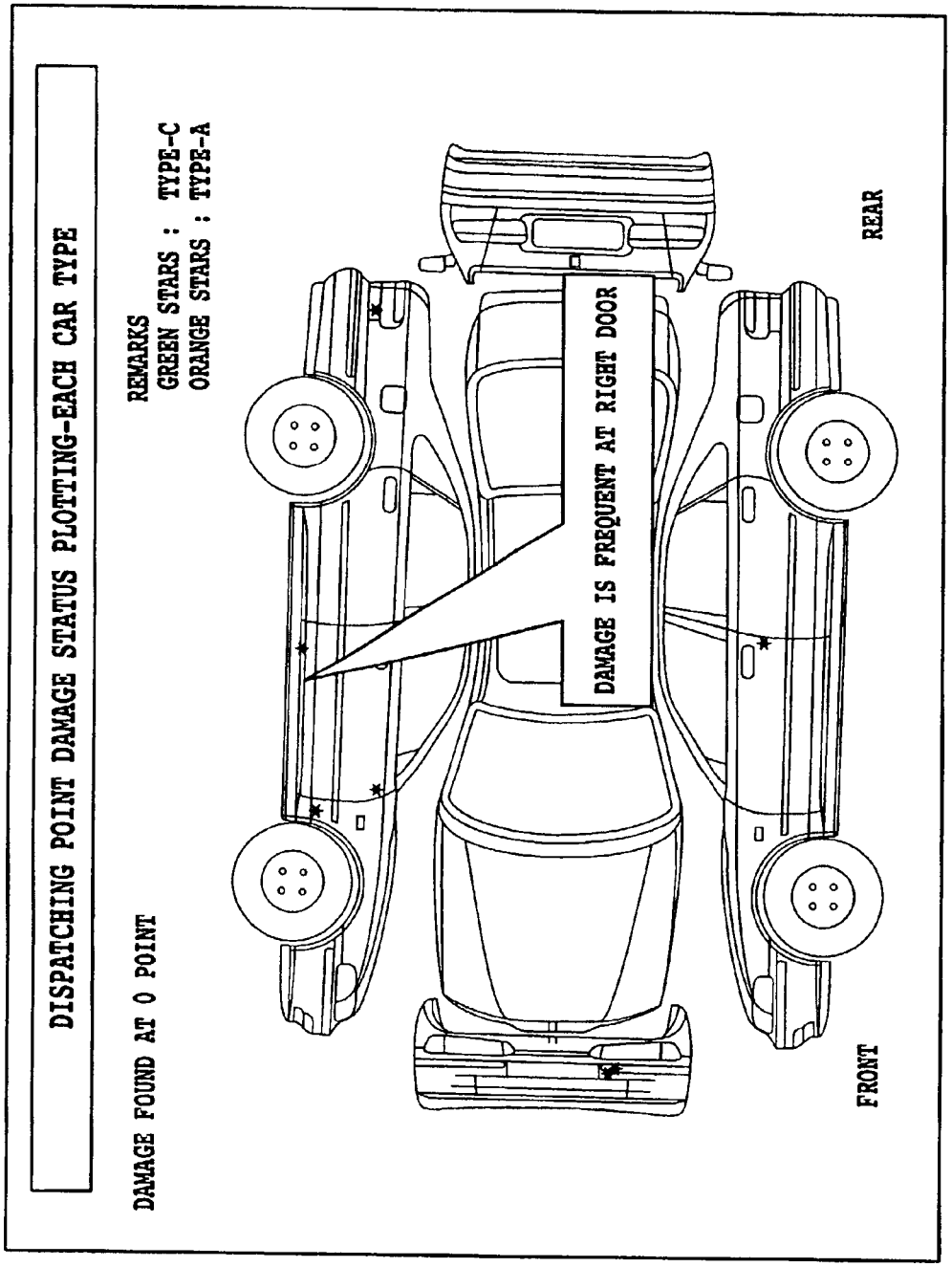
FIG. 11 is a development of a car showing the status of damage for each car type observed when dispatching quality was checked.

FIG. 11 is a development of a car showing the status of damage for each car type observed when dispatching quality was checked. For the checked cars of each grade, the points at which damage concentrated, i.e. the points at which plural ones of the checked cars of the same grade are similarly damaged are marked with stars of different colors. Since the damage concentrates for both grades, the analysis operator adds an analysis result indicating that "damage is frequent at right door", to the analysis screen.

The position of the damage in the "right door" is precisely displayed on the drawing, so that it is easy to determine manual operations or obstacles that may come in contact with that height or position during the transportation process. Compared to a conventional report indicating only that "flaw present in the right door", analysis and estimation of the cause is much easier.

Figure 12:
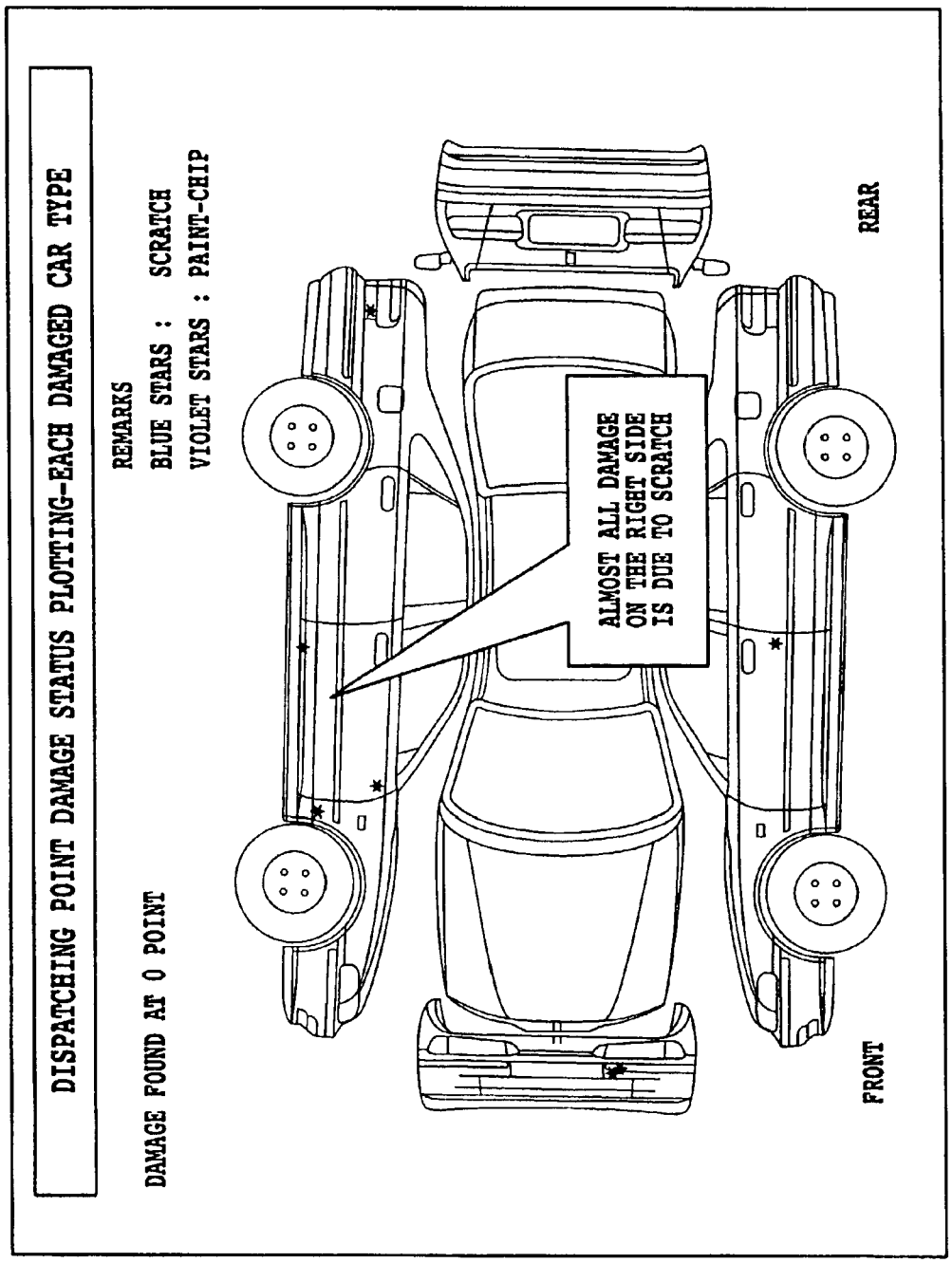
FIG. 12 is a development of a car showing the status of damage for each damaged car type observed when dispatching quality was checked.

FIG. 12 is a development of a car showing the status of damage for each damaged car type observed when dispatching quality was checked. For the checked cars, the points at which similar damage concentrated, i.e. the points at which plural ones of the checked cars were similarly damaged are marked with stars. Since the damage concentrates, the analysis operator adds an analysis result indicating that "almost all damage on the right side is due to scratch", to the analysis screen.

Figure 13:
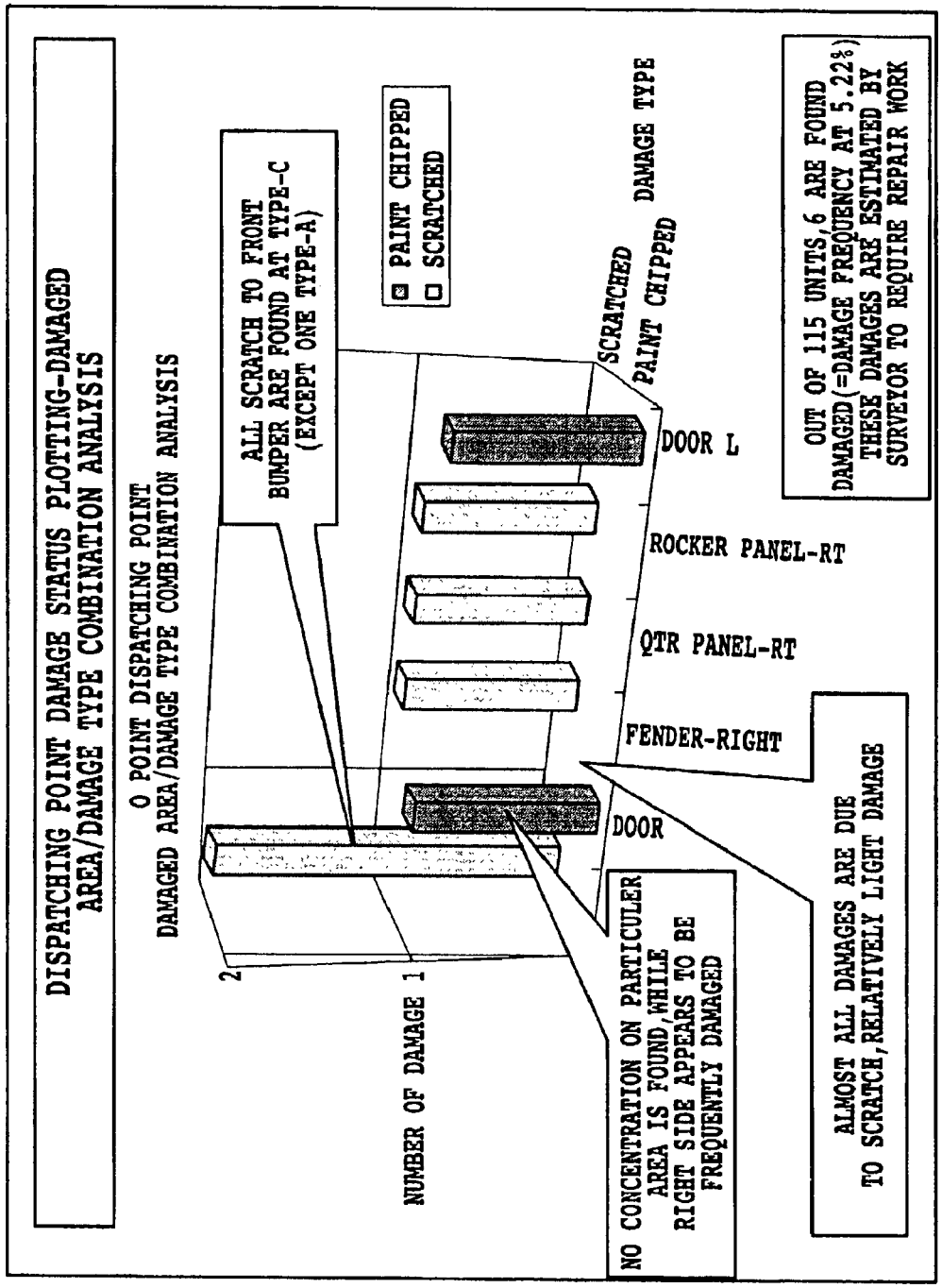
FIG. 13 is a graph showing the results of composite analysis of damaged areas and types carried out when dispatching quality was checked.

FIG. 13 shows the results of composite analysis of damaged areas and types carried out when dispatching quality was checked. In this figure, the analysis results are shown as a bar graph, and the analysis operator has added remarks to the graph.

In addition to the analysis based on the damaged position information, the pieces of registered distribution attribute information are arbitrarily combined together to analyze the tendency of the damage in various manner.

Figure 14:
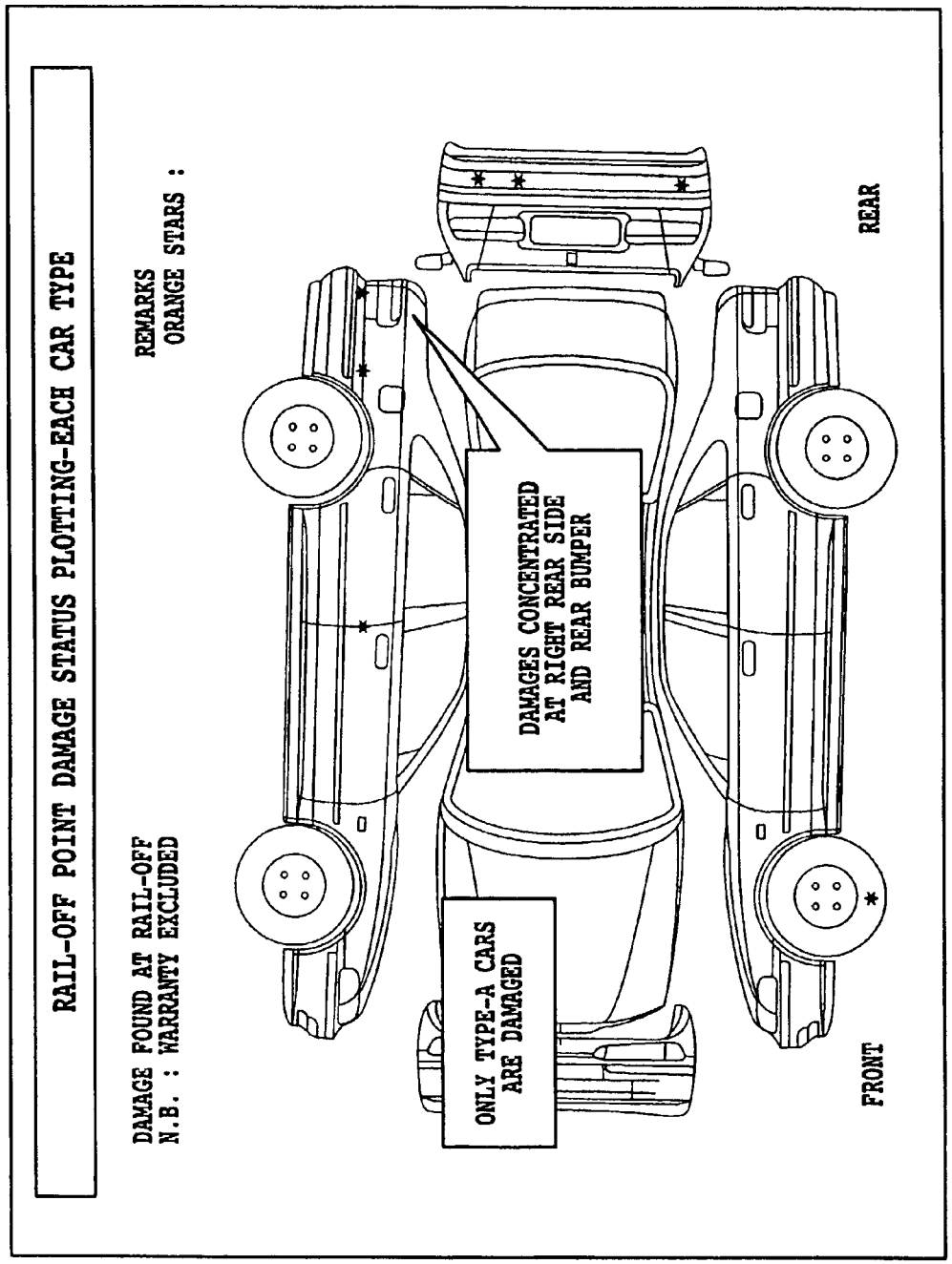
FIG. 14 is a development of a car showing the status of damage for each car type observed when railway transportation quality was checked.

FIG. 14 is a development of a car showing the status of damage for each car type observed when railway transportation quality was checked. For the checked cars of each type, the points at which damage concentrated are marked with starts of different colors. Damage occurred only in the TYPE-A grade and concentrated in the rear right portion of the car and the rear bumper. Accordingly, the analysis operator has added a corresponding analysis result to the analysis screen.

Figure 15:
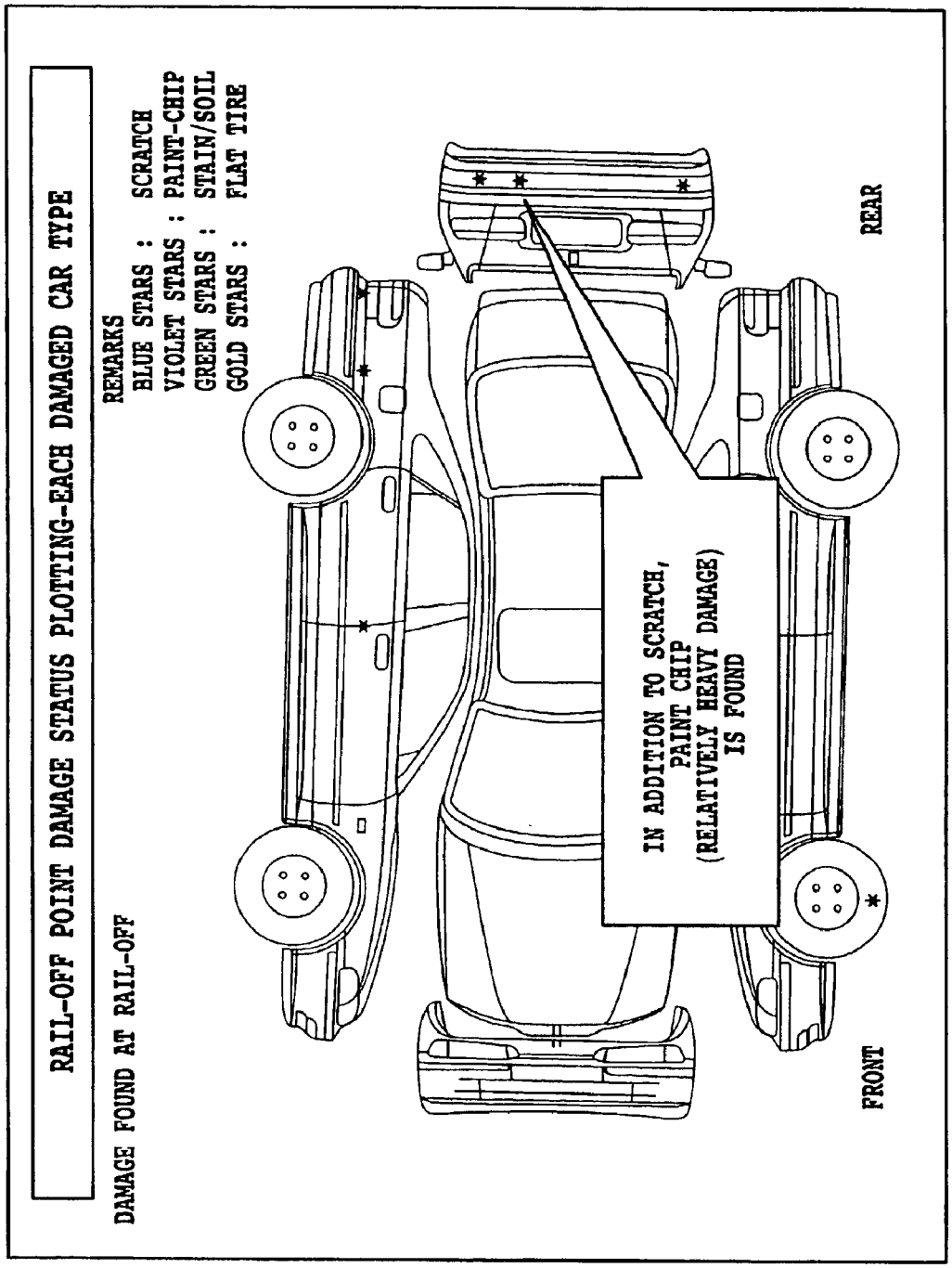
FIG. 15 is a development of a car showing the status of damage for each damaged car type observed when railway transportation quality was checked.

FIG. 15 is a development of a car showing the status of damage for each damaged car type observed when railway transportation quality was checked. The confirmed damage includes not only scratches but also heavy damage caused by paint chips. The analysis operator has added a corresponding analysis result to the analysis screen.

Figure 16:
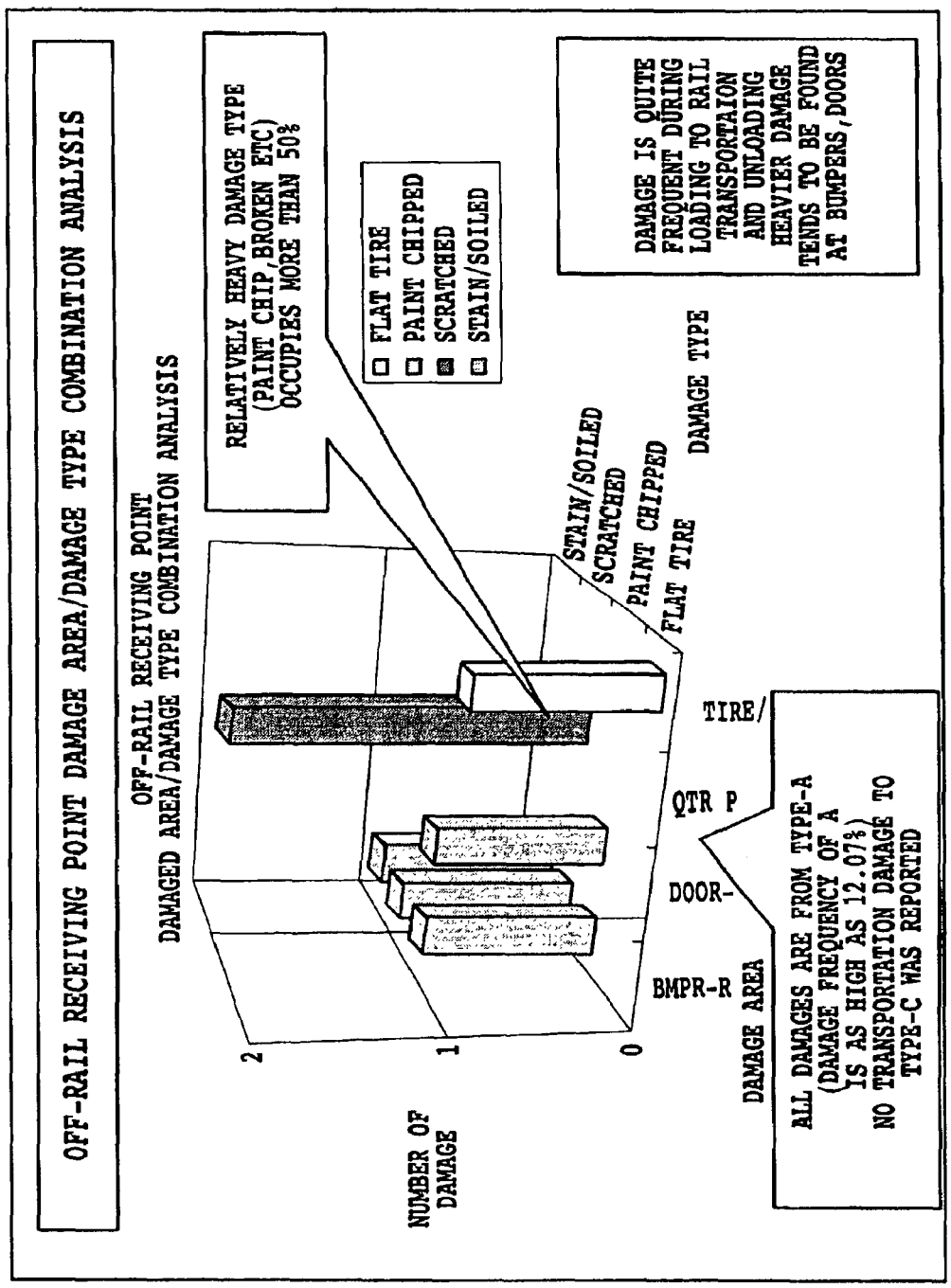
FIG. 16 is a graph showing the results of composite analysis of damaged areas and types carried out when railway transportation quality was checked.

FIG. 16 is a graph showing the results of composite analysis of damaged areas and types carried out when railway transportation quality was checked. In this figure, the analysis results are shown as a bar graph, and the analysis operator has added remarks to the graph.

Figure 17:
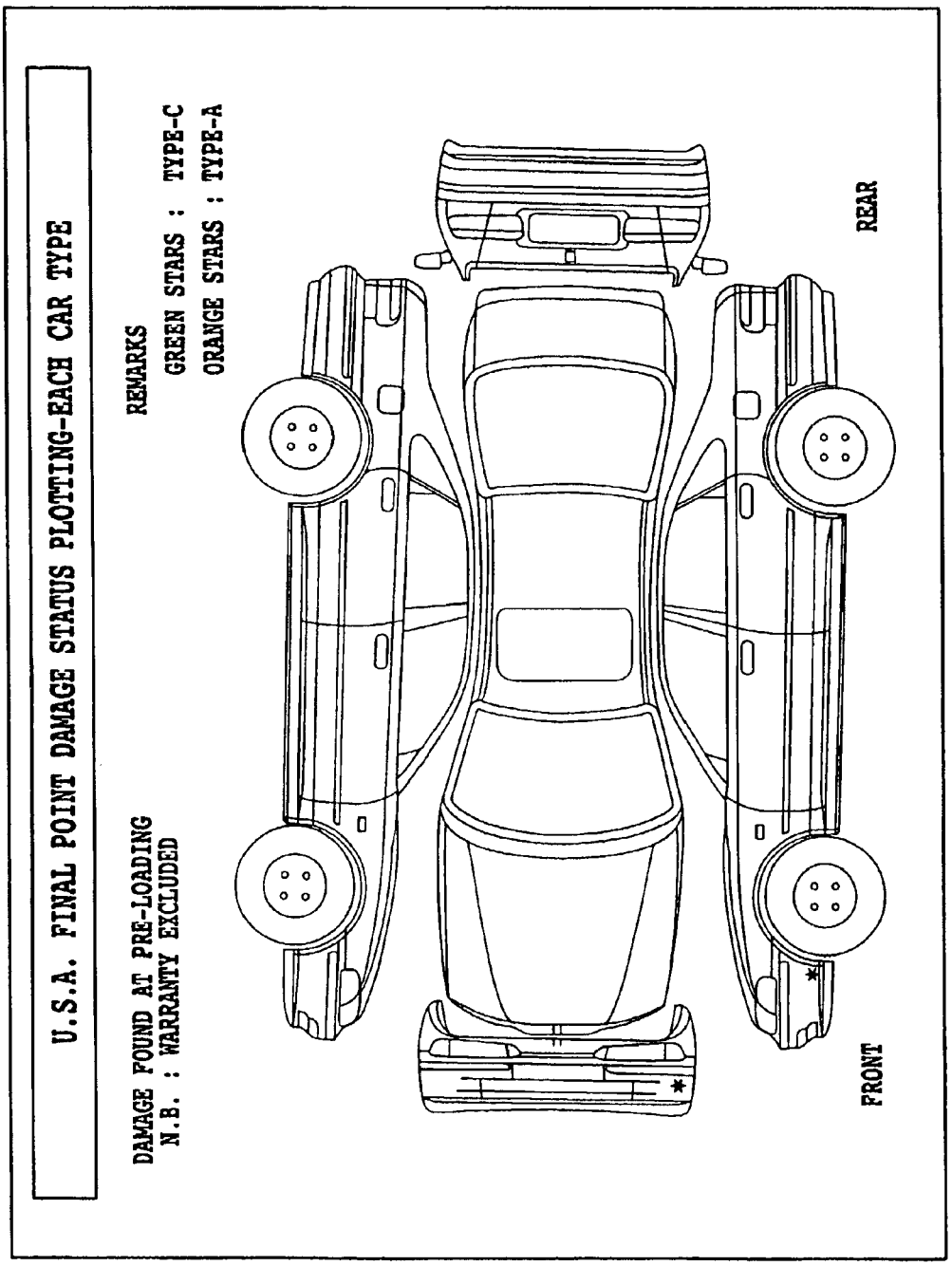
FIG. 17 is a development of a car showing the status of damage for each car type observed when pre-loading quality was checked.

FIG. 17 is a development of a car showing the status of damage for each car type observed when pre-loading quality was checked.

Figure 18:
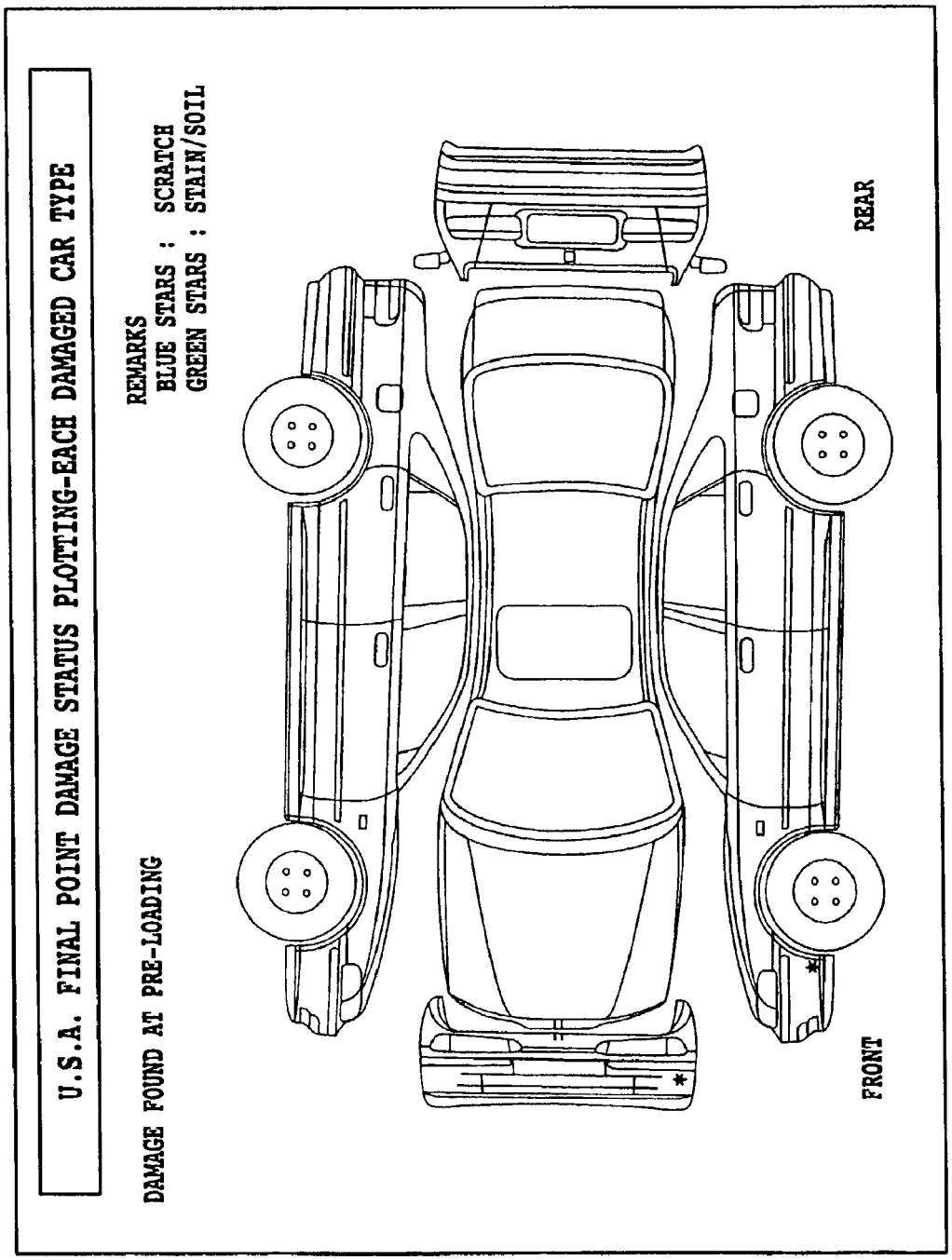
FIG. 18 is a development of a car showing the status of damage for each damaged car type observed when pre-loading quality was checked.

FIG. 18 is a development of a car showing the status of damage for each damaged car type observed when pre-loading quality was checked.

Figure 19:
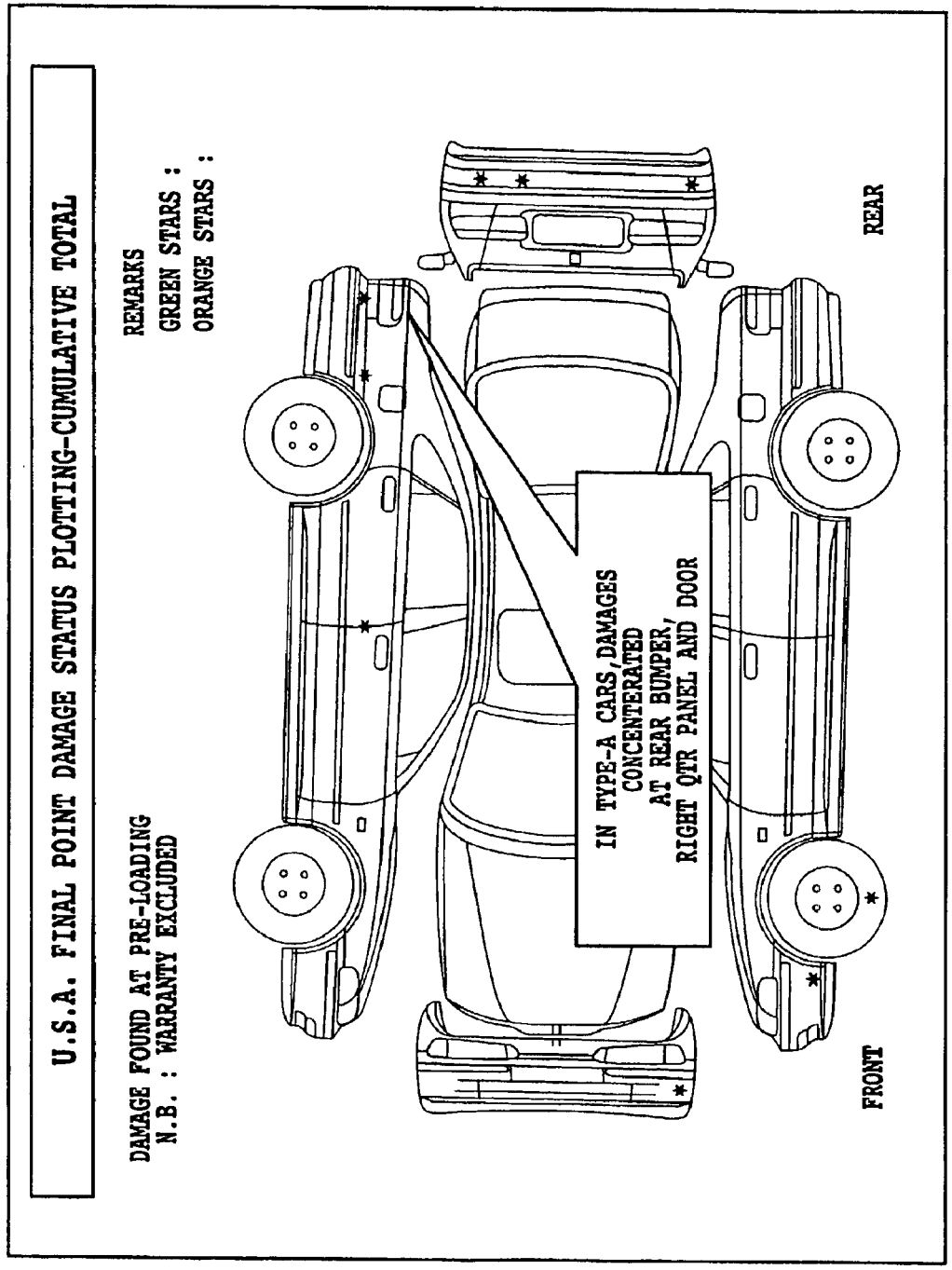
FIG. 19 is a development of a car showing the cumulative total of the status of damage for the same car type observed when pre-loading quality was checked.

FIG. 19 is a development of a car showing the cumulative total of the status of damage for the same car type observed when pre-loading quality was checked. For the type-A cars, this figure indicates that damage concentrates in the rear bumper and the right QTR panel and door. The analysis operator has added a corresponding analysis result to the analysis screen.

Figure 20:
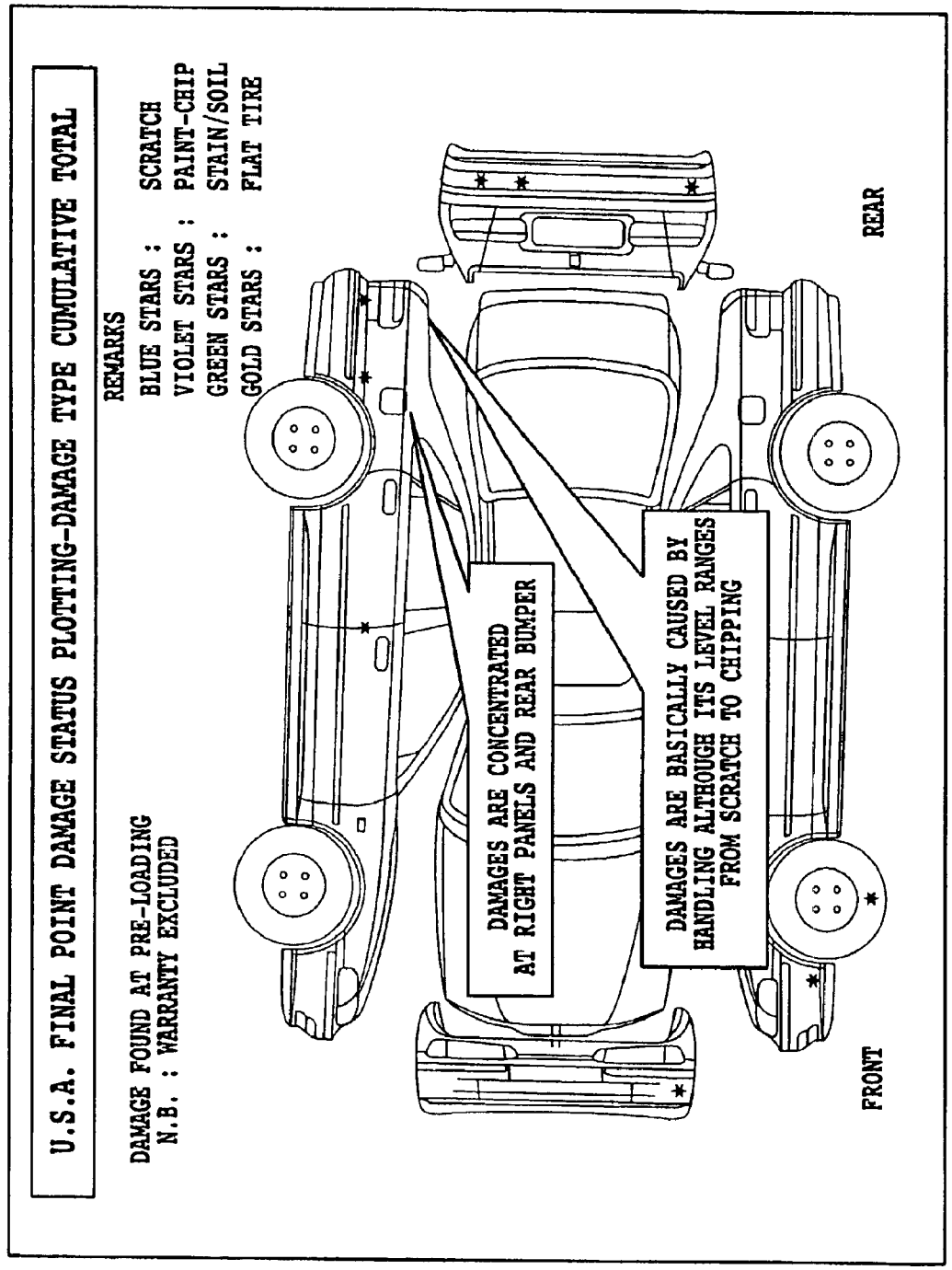
FIG. 20 is a development of a car showing the cumulative total of the status of damage for the same damaged car type observed when pre-loading quality was checked.

FIG. 20 is a development of a car showing the cumulative total of the status of damage for the same damaged car type observed when pre-loading quality was checked. This figure indicates that damage concentrates in the right panel surface and the rear bumper. Although there is a slight difference in damage level between scratches and paint chips, these flaws are essentially handling damage. The analysis operator has added a corresponding analysis result to the analysis screen.

In this manner, damage data are accumulated one by one under arbitrary conditions and displayed on a plan view. For particular cars transported under particular conditions, the tendency of damage occurring in particular areas can be discovered to facilitate analysis and estimation of the cause of the damage.

Figure 21:
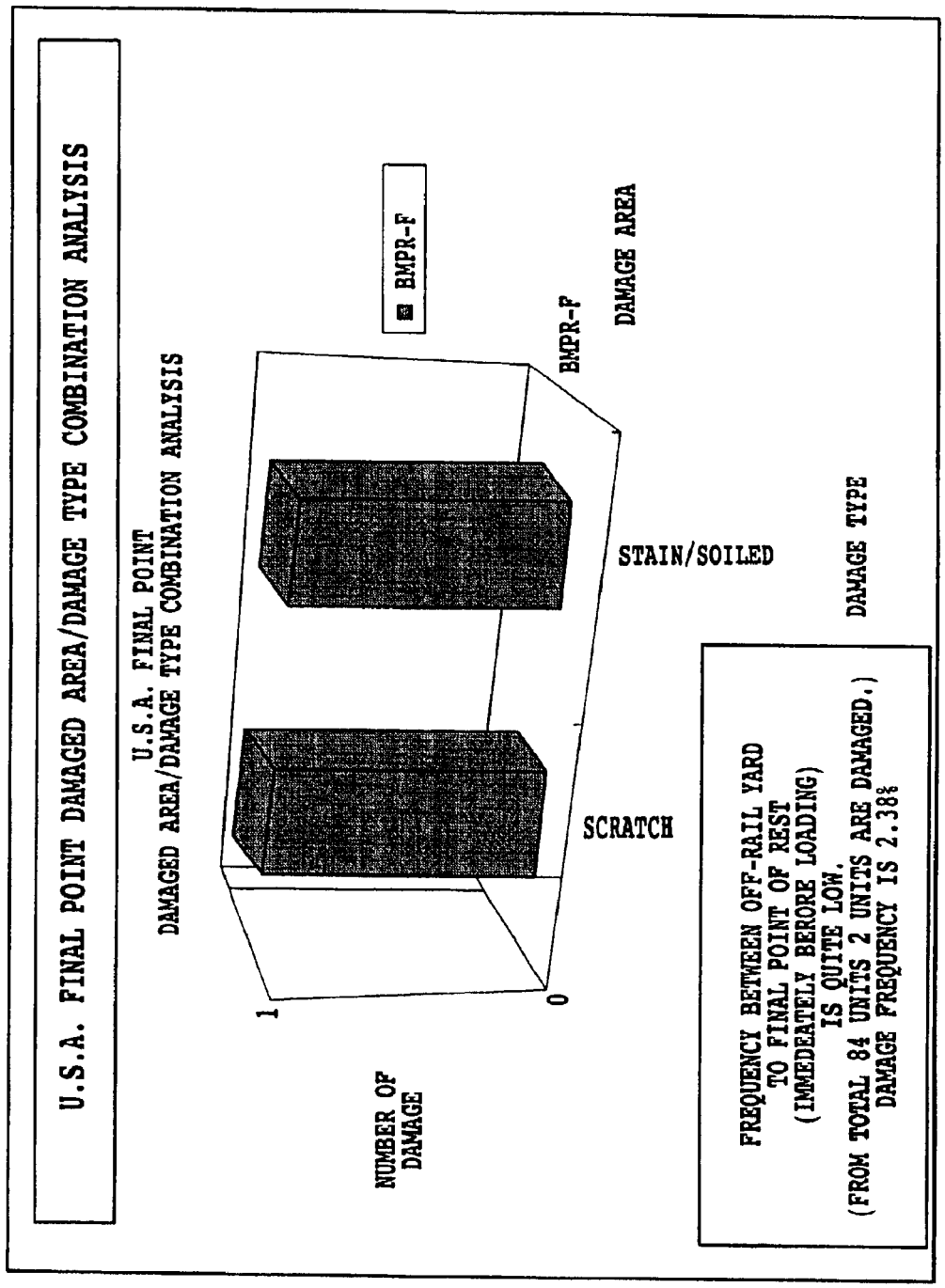
FIG. 21 is a graph showing the results of composite analysis of damaged areas and types carried out when pre-loading quality was checked.

FIG. 21 shows the results of composite analysis of damaged areas and types carried out when pre-loading quality was checked. In this figure, the analysis results are shown as a bar graph, and the analysis operator has added remarks to the graph.

Figure 22:
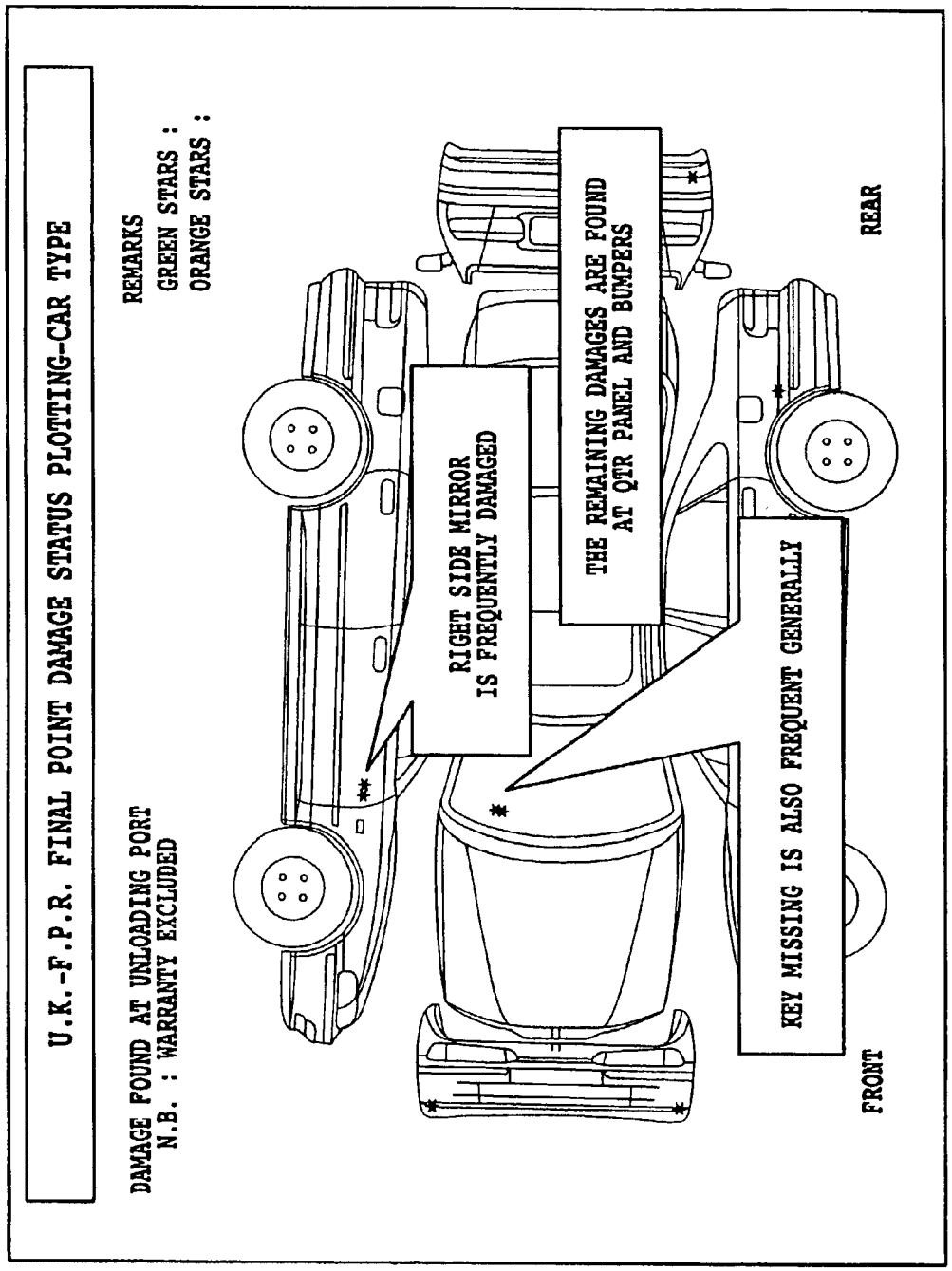
FIG. 22 is a development of a car showing the status of damage for each car type observed when ocean shipping quality was checked.

FIG. 22 is a development of a car showing the status of damage for each car type observed when ocean shipping quality was checked. The significant occurrence of damage to the right door mirror and the distribution of damage to the QTR panel and bumper have been added to the analysis screen as analysis results. The generally high frequency of key missing has also been added to the screen.

Figure 23:
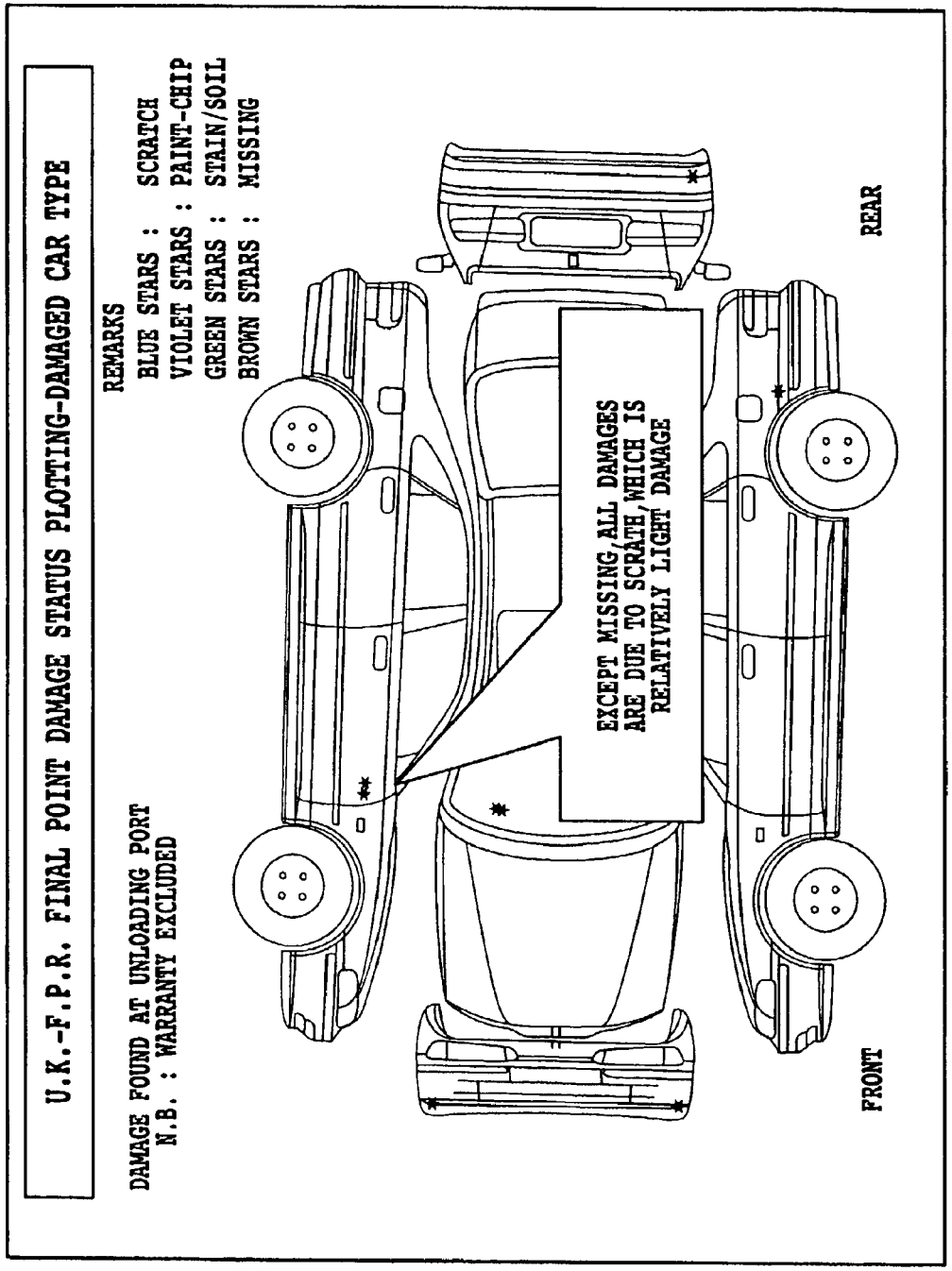
FIG. 23 is a development of a car showing the status of damage for each damaged car type observed when ocean shipping quality was checked.

FIG. 23 is a development of a car showing the status of damage for each damaged car type observed when ocean shipping quality was checked. It has been confirmed that the key is missing. The damage determined to be a scratch damage level is relatively slight, so that a corresponding analysis result has been added to the analysis screen.

Figure 24:
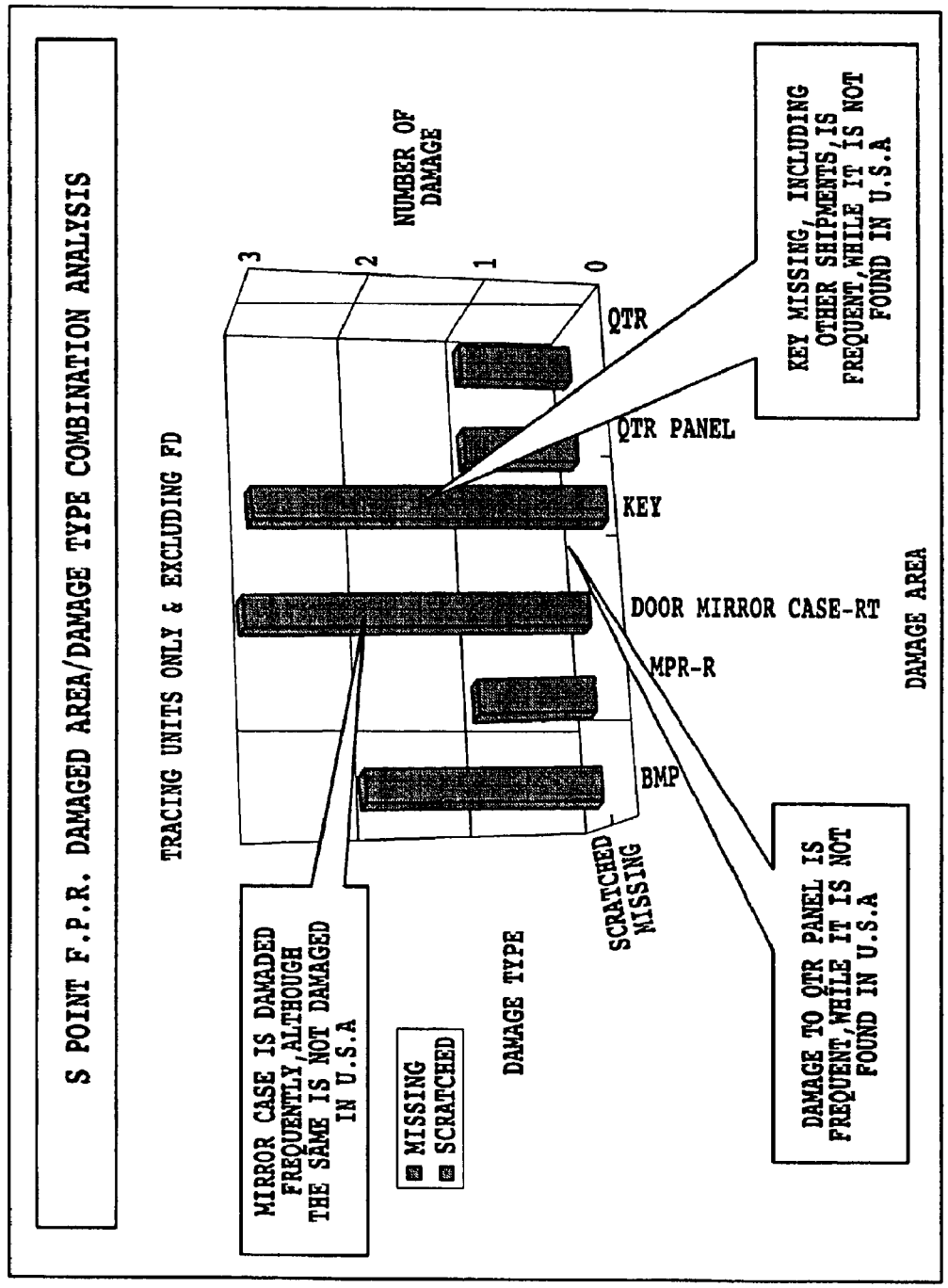
FIG. 24 is a graph showing the results of composite analysis of damaged areas and types carried out when ocean shipping quality was checked.

FIG. 24 shows the results of composite analysis of damaged areas and types carried out when ocean shipping quality was checked. In this figure, the analysis results are shown as a bar graph, and the analysis operator has added remarks to the graph.

Figure 25:
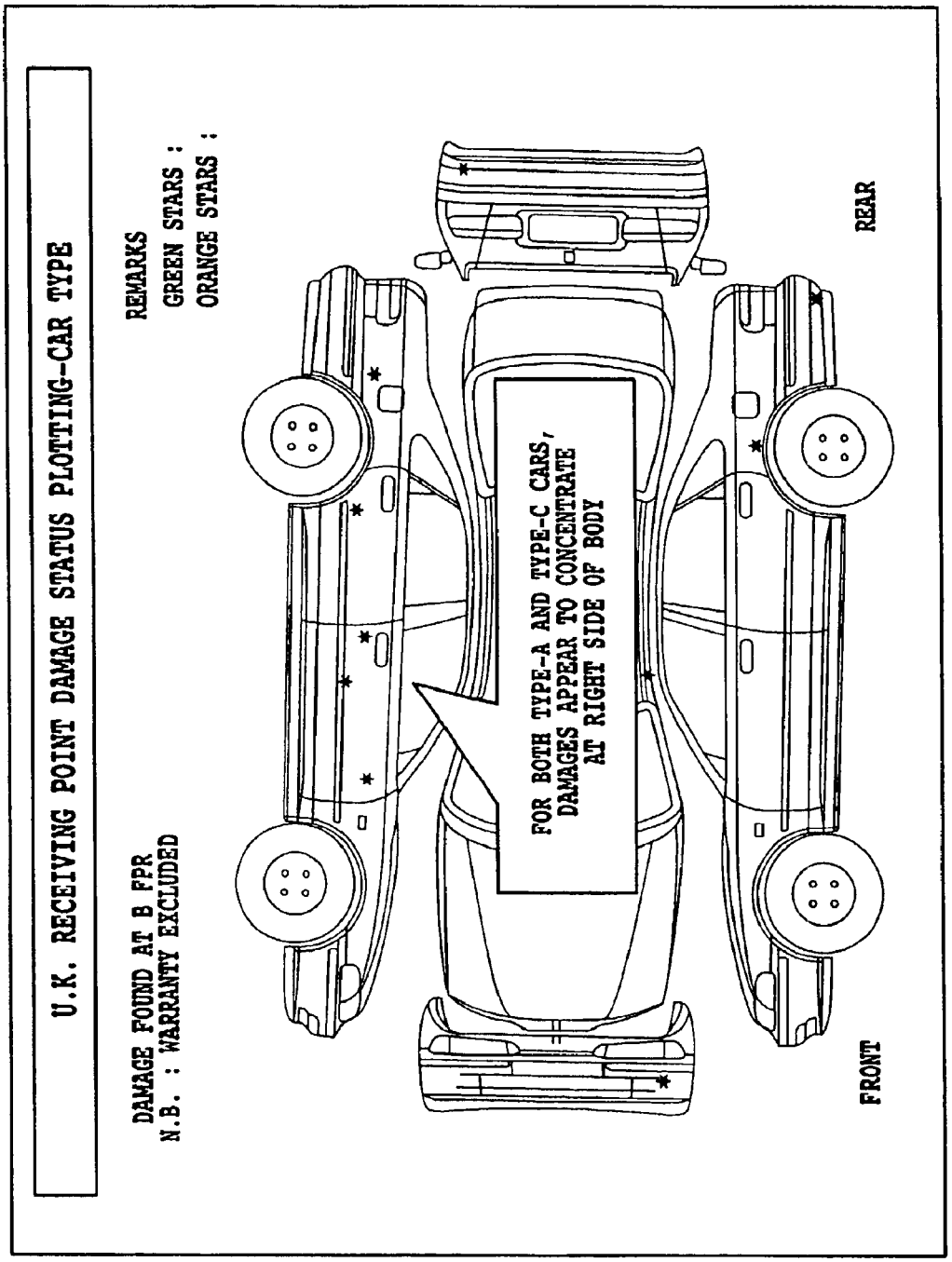
FIG. 25 development of a car showing the status of damage for each car type observed when the contents of repairs were finally checked.

FIG. 25 development of a car showing the status of damage for each car type observed when the contents of repairs were finally checked. For both TYPE-A and TYPE-B cars, this figure indicates that damage concentrates in the upper part of the right body, and a corresponding analysis result has been added to the analysis screen.

Figure 26:
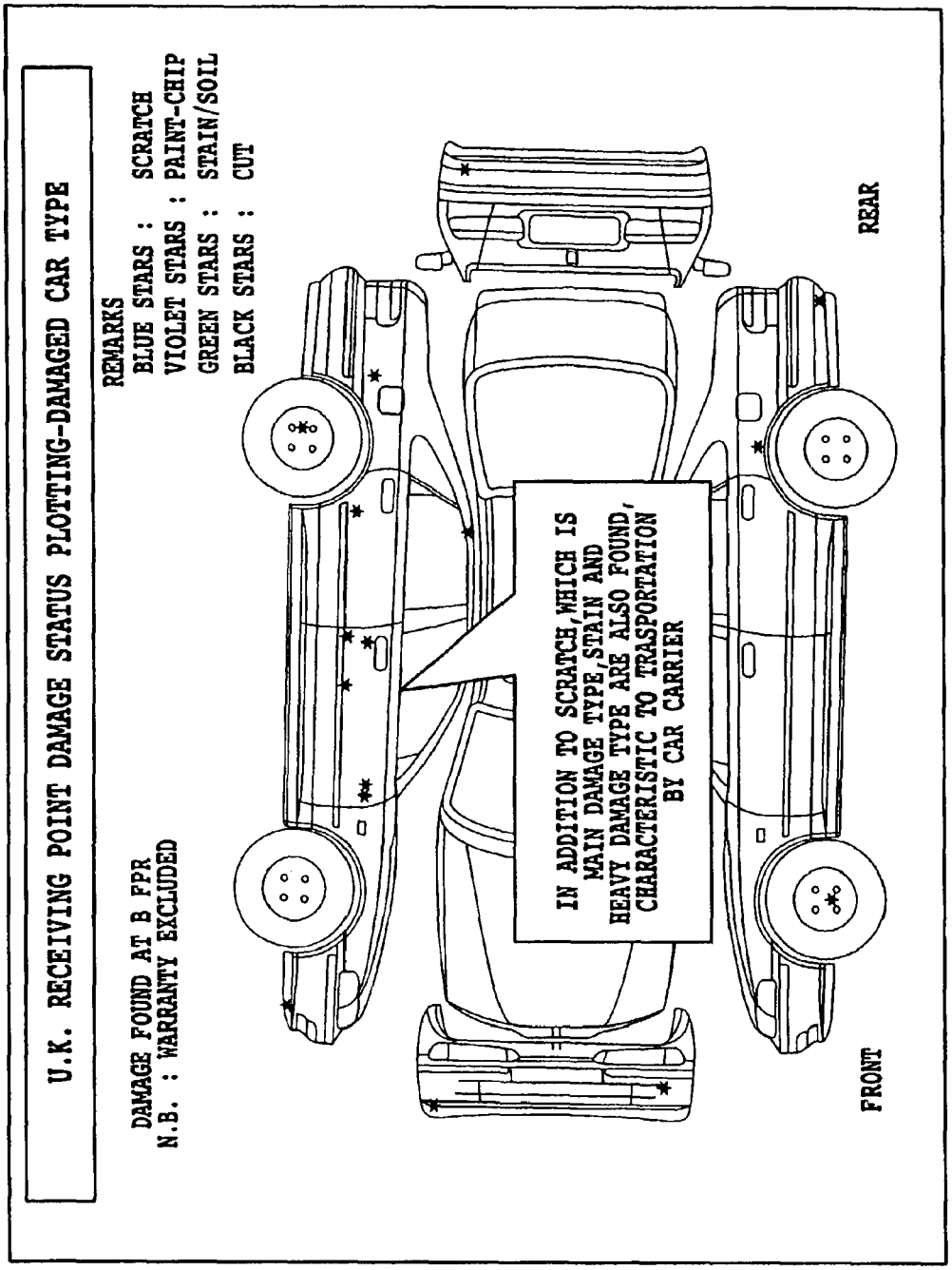
FIG. 26 is a development of a car showing the status of damage for each damaged car type observed when the contents of repairs were finally checked.

FIG. 26 is a development of a car showing the status of damage for each damaged car type observed when the contents of repairs were finally checked. A large number of scratches have been found. Stains and severe damage unique to car carrier transportation have also been found, and a corresponding analysis result has been added to the analysis screen.

Figure 27:
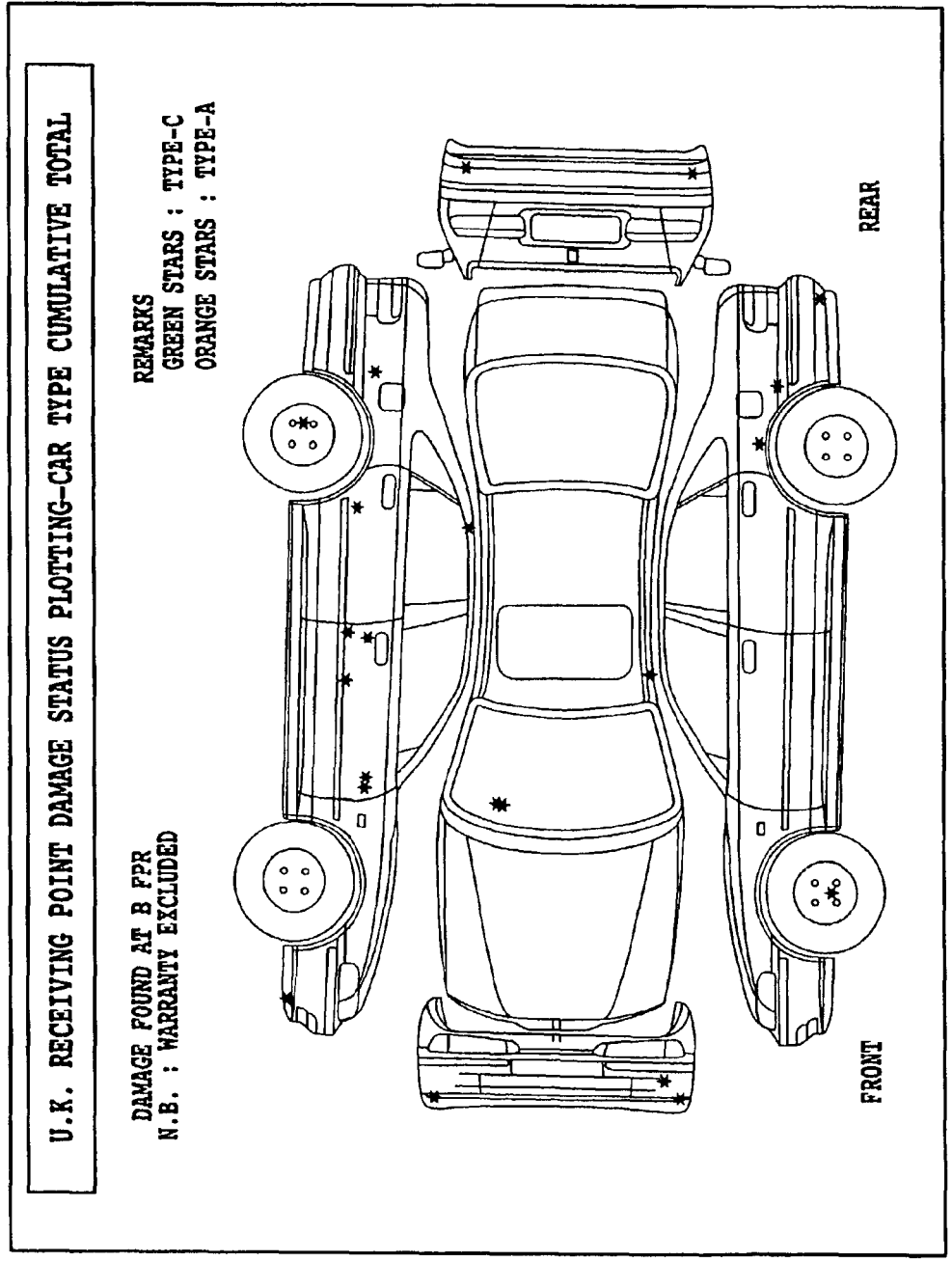
FIG. 27 is a development of a car showing the cumulative total of the status of damage for the same car type observed when the contents of repairs were finally checked.

FIG. 27 is a development of a car showing the cumulative total of the status of damage for the same car type observed when the contents of repairs were finally checked.

Figure 28:
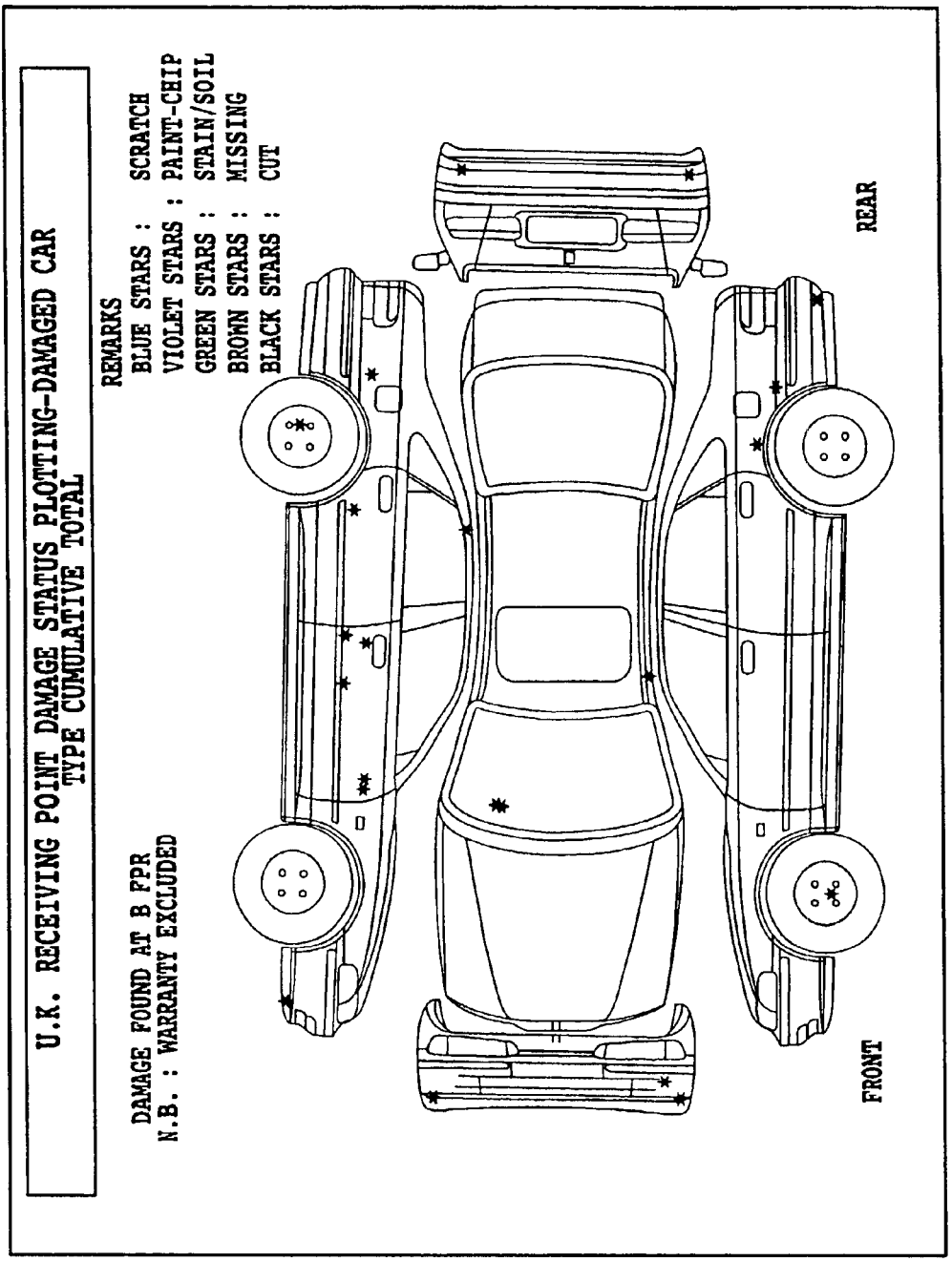
FIG. 28 is a development of a car showing the cumulative total of the status of damage for the same damaged car type observed when the contents of repairs were finally checked.

FIG. 28 is a development of a car showing the cumulative total of the status of damage for the same damaged car type observed when the contents of repairs were finally checked.

Figure 29:
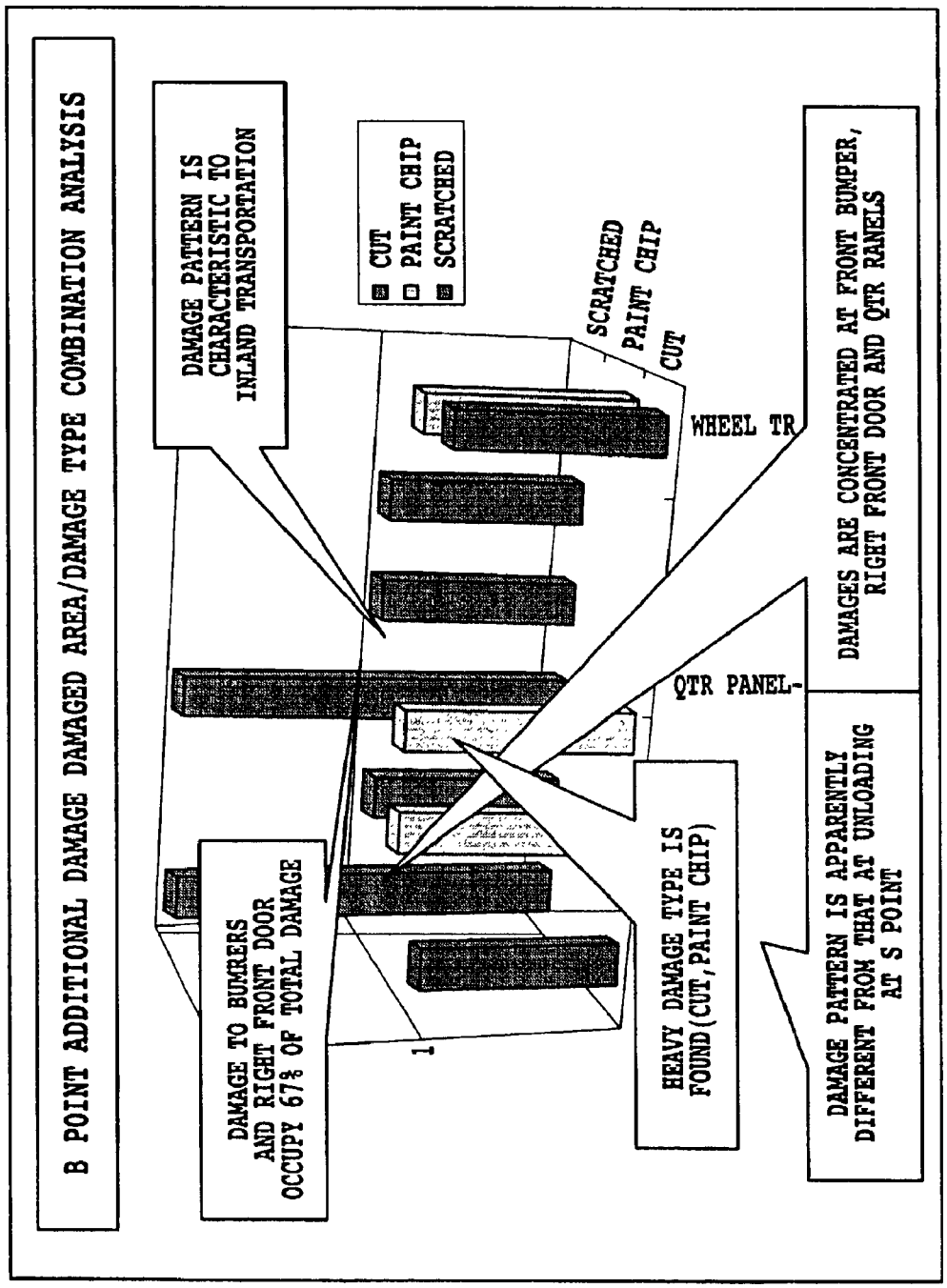
FIG. 29 is a graph showing the results of composite analysis of damaged areas and types carried out when the contents of repairs were finally checked.

FIG. 29 shows the results of composite analysis of damaged areas and types carried out when the contents of repairs were finally checked. In this figure, the analysis results are shown as a bar graph, and the analysis operator has added remarks to the graph.

Figure 30:
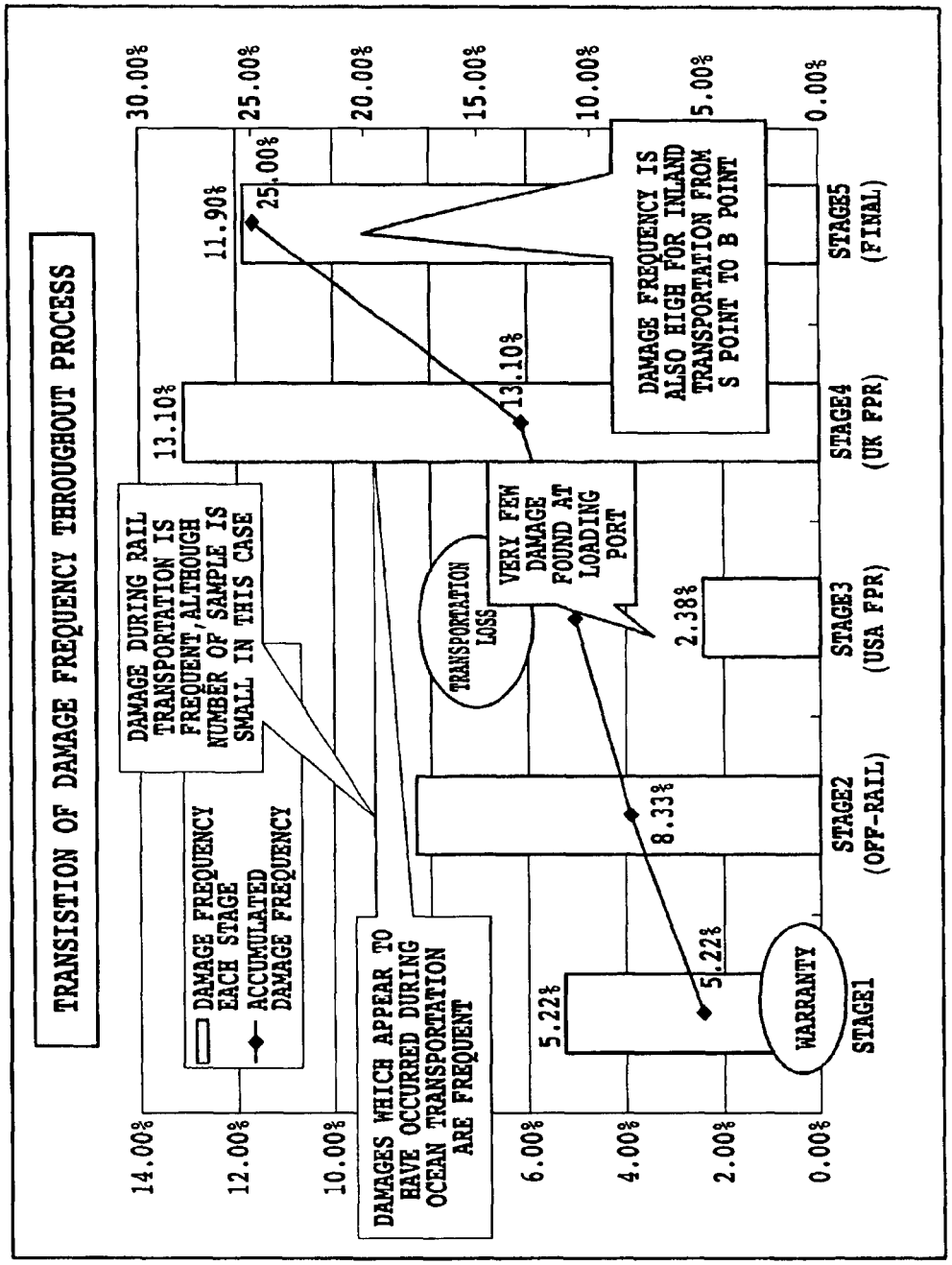
FIG. 30 is a graph showing the transition of the frequency of damage during the entire transportation process according to Embodiment 2.

FIG. 30 shows the transition of the frequency of damage during the entire transportation process according to Embodiment 2. The analysis operator has added remarks to the graph.

Figure 31:
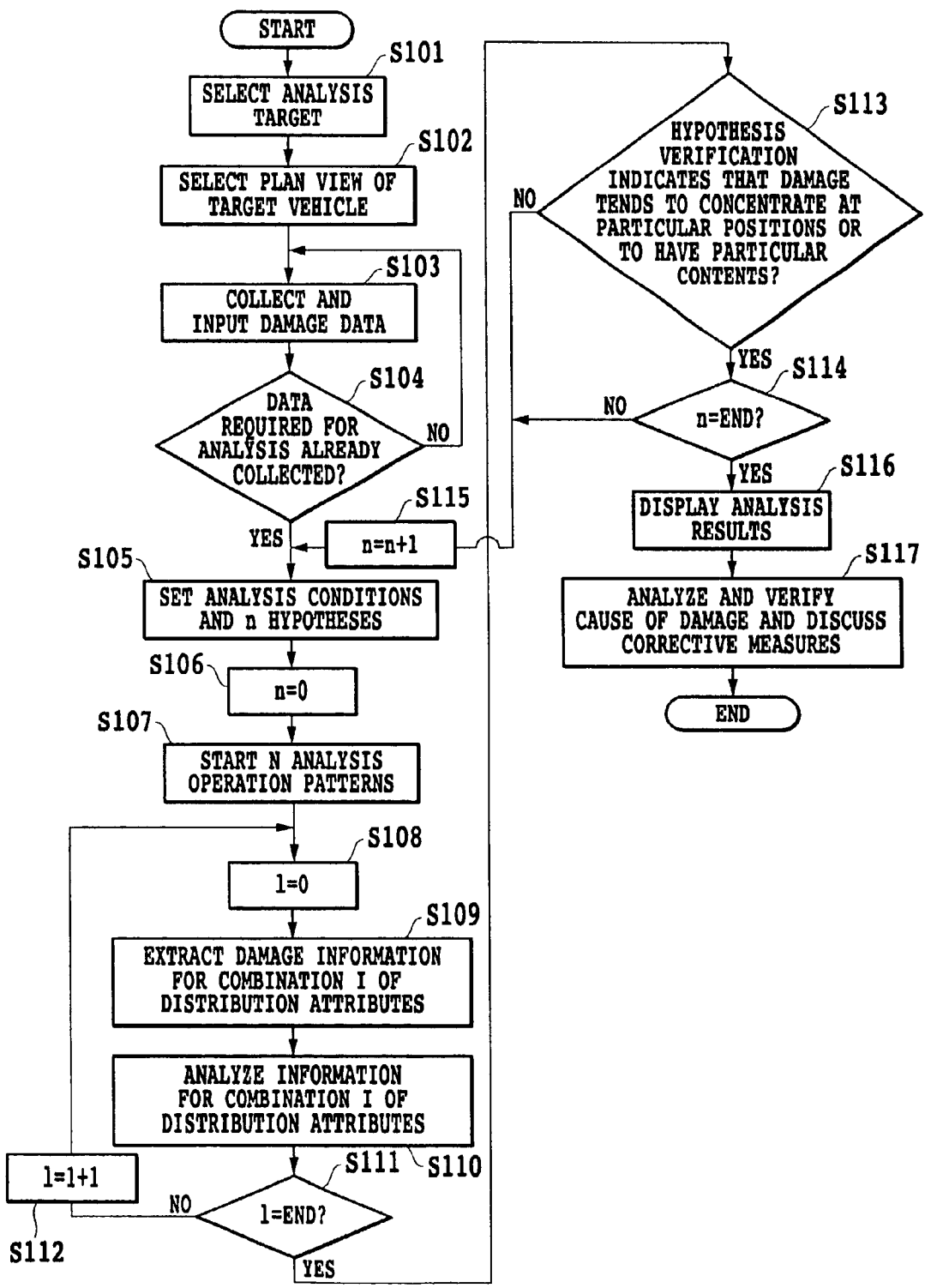
FIG. 31 is a flow chart showing the flow of a process executed by the damage status analyzing system 1.
Figure 32:
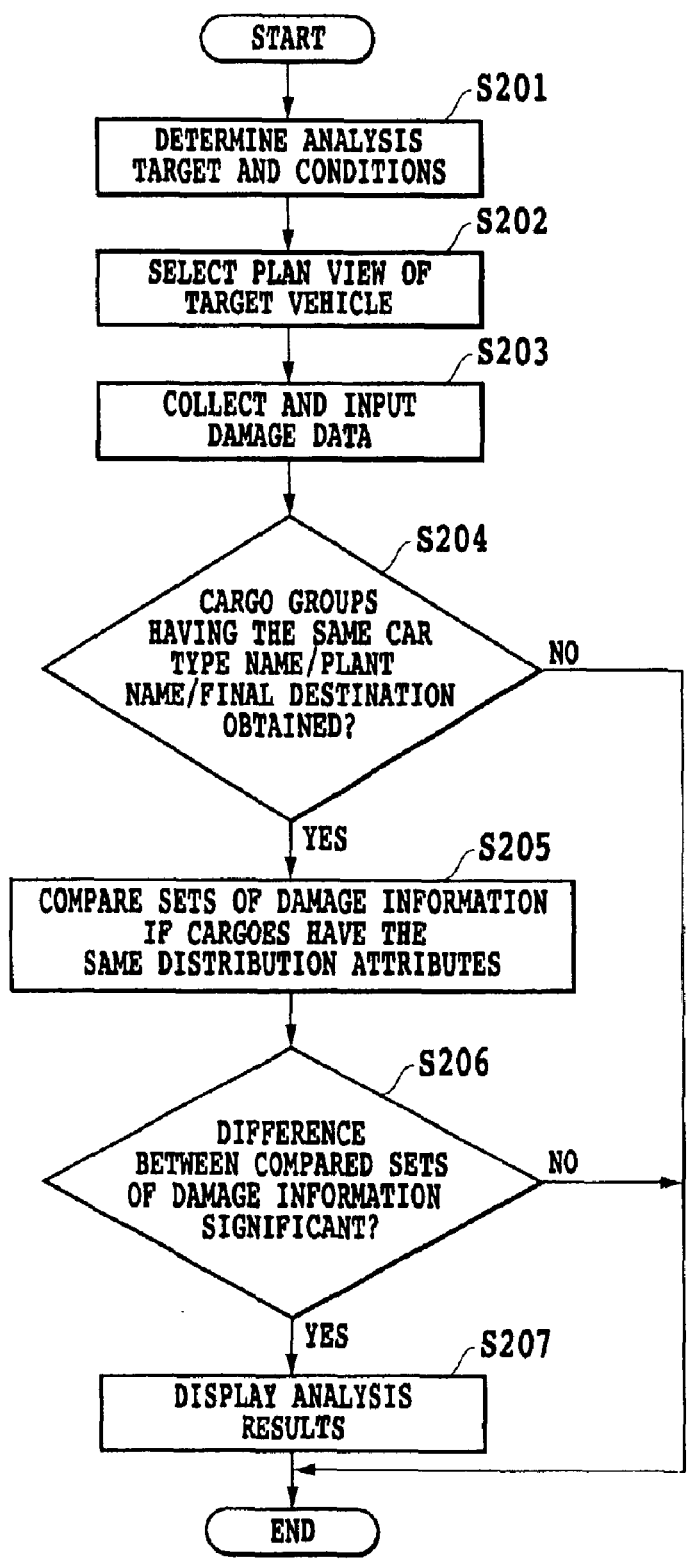
FIG. 32 is a flow chart showing the flow of a process executed to analyze the status of damage in different cargoes.

FIGS. 31 and 32 are flow charts showing the flow of a process executed mainly by the damage status analyzing system 1.

To carry out damage analysis using the damage status analyzing system 1, the following methods are used: A data mining method formulates a certain hypothesis concerning the cause of the damage and sequentially provides arbitrary analysis conditions to analyze tendencies obtained (as shown in FIG. 31). Another method uses initially fixed particular conditions, observes specified points for damage, compares the results of the observation, and records the actual situation of damage for each point, each section, and each transportation method.

In the data mining method in FIG. 31, an analysis target is selected (step S101), and a plan view of a product, that is, the vehicle in this embodiment is set in the damage status analyzing system 1 (step S102). Then, damage check data required for analysis is collected, and various pieces of distribution attribute information are input and saved to the damage status analyzing system 1 together with damaged position information (X and Y coordinate axes) (step S103).

After checking whether or not data required for analysis has been obtained (step S104), and n hypotheses concerning several causes of damage are formulated in accordance with the data mining method. For each hypothesis, I analysis conditions required to verify the hypothesis are set (step S107), and an analysis operation is continuously performed until each analysis pattern is completed (steps S106 and S109).

During the analysis process, if a significant tendency different from the others in the position, state, or content of the damage is observed on the basis of the analysis pattern based on the original hypothesis or an analysis pattern that has not initially been provided, then it is likely that this damage is not an accidental occurrence but has been caused by a problem unique to the distribution process (step S114). Accordingly, the cause of the damage is analyzed and verified, and corrective measures are discussed (step S115).

The method in FIG. 32 uses initially fixed analysis conditions to check particular locations or sections for damage, using positional information. An analysis target and conditions are determined (step S201), a plan view of the vehicle, a target product, is set in the damage status analyzing system 1 (step S202). Damage data required for analysis is collected and input (step S203).

Then, analysis is carried out on the basis of the predetermined conditions. For example, in this embodiment, the status of damage occurring in different groups of cargoes is analyzed. Although the cargo groups are different from each other, comparison can be achieved only if cargo groups to be compared have the same car type name, plant code, and final destination. Thus, first, these pieces of distribution attribute information are checked (step S204). If theses pieces of information do not match (step S204; No), the process is ended.

If these pieces of information match (step S204; Yes) and if the cargoes have the same distribution attributes, the sets of damage information on these cargoes are compared (step S205). It is checked whether or not there is a significant difference between these sets of damage information (step S206). For example, if this difference can be numerically expressed, it is determined whether or not the difference exceeds a predetermined threshold.

If the difference between these sets of information is not significant (step S206; No), the process is ended. If the difference is significant (step S 206; Yes), the results of the analysis are displayed (step S207), and the process is ended.

Thus, with the damage status analyzing system 1, the product can be checked by mainly checking whether or not the occurrence of damage has a particular tendency, while variously switching arbitrary conditions. In addition to such damage tendency analysis based on the data mining method, the system 1 can be applied to the method of using initially fixed particular conditions to check particular sections, locations, and distribution attributes for damage.

According to this embodiment, while determining damaged positions indicated by X and Y coordinates, damage information such as the type and level of damage and distribution attribute information obtained during transportation are accumulated. This enables prompt and adequate analysis of the tendency and characteristic of damage such as the status and position thereof in distribution processes, for which visually more precise determinations are important.

In particular, since the damaged position information is indicated by planar two-dimensional position coordinates, it is possible to visually closely and statistically determine the tendency of damage such as the position and status thereof. Accordingly, presenting the results of analysis to the analysis operator enables prompt and adequate determination and analysis of the tendency and characteristic of damage such as the status and position thereof in the distribution process. Further, the cause of damage during car transportation can be easily analyzed, thereby enabling the determination of whether to take drastic or simple measures for the damage.

The damage status analyzing system 1 is not limited to the above-described embodiments, and various changes may be made thereto without deviating from the spirits of the present invention.

As described above, according to the damage status analyzing method and system, damage status input terminal, recording medium, and computer program product of the present invention, while determining damaged positions indicated by X and Y coordinates, damage information such as the type and level of damage and distribution attribute information obtained during transportation are accumulated. It is important to visually more precisely determine the status of damage. Accordingly, the present invention is very effective in enabling prompt and adequate analysis of the tendency and characteristic of damage such as the status and position thereof in distribution processes.

In particular, since the damaged position information is indicated by planar two-dimensional position coordinates, damage information such as the type and level of damage and distribution attribute information obtained during transportation are accumulated in connection with the damaged position information. By combining these pieces of information together under various conditions and displaying and analyzing damaged positions and the contents thereof, the damaged positions can be visually more precisely determined.

INDUSTRIAL APPLICABILITY

As described above, with the damage status analyzing method and system, damage status input terminal, recording medium, and computer program product according to the present invention, it is possible to promptly and adequately analyze the tendency and characteristic of damage such as the status and position thereof in distribution processes. Therefore, the present invention is suitable for establishing a distribution process with minimized damage.

What is claimed is:

1. A damage status analyzing method comprising:
    inputting data for a plurality of articles into a data base, the data comprising:
        (a) distribution attributes for each article, the distribution attributes including a plurality of checked locations along a path of distribution of the articles where each article is inspected for damage to use in determining where in the path of distribution damage occurs; and
        (b) damage information for each article, the damage information including damage position information, in the form of planar two-dimensional position coordinates relative to a schematic representation of each article, which indicates a position of damage on each article at each checked location;
    selecting from the inputted data one or more of the distribution attributes for the plurality of articles;
    retrieving damage information indicative of damage concentrating at a particular position on the basis of the damaged position information on the articles satisfying the selected one or more distribution attributes;
    classifying the damage information retrieved in the retrieving act according to said one or more selected distribution attributes; and
    adding said damage information to a plan view of said article on the basis of the damaged position information on the articles satisfying the one or more distribution attributes and outputting the plan view with the damage information added thereto to a presentation section.

2. A damage status analyzing method according to claim 1, wherein said distribution attributes include an item indicative of time series of the distribution, and
    said classification act classifies said retrieved damage information according to said time series.

3. A damage status analyzing method according to claim 1, wherein said distribution attributes include an item indicative of a type of the article, and
    said classification act classifies said retrieved damage information according to said type of article.

4. A damage status analyzing method according to claim 1, wherein said classification act classifies said retrieved damage information according to said checked locations where the article was inspected for damage.

5. A damage status analyzing method according to claim 1, wherein said distribution attributes include transportation information having at least one of a transportation means, a transportation route, and a transporter, and
    said classification act classifies said retrieved damage information according to said transportation information.

6. A damage status analyzing method according to claim 1, wherein said damage information includes an item indicative of a type of damage, and
    said classification act classifies said damage information according to said type of damage.

7. A damage status analyzing method according to claim 1, wherein said damage information includes an item indicative of a degree of damage, and
    said classification act classifies said damage information according to said degree of damage.

8. A damage status analyzing method according to claim 1, wherein in said display act outputs said plan view of the article with said damage information added thereto and a spread sheet for said retrieved damage information.

9. A damage status analyzing method according to claim 1, wherein in said display act adds results of analysis associated with said particular position to said plan view of the article.

10. A damage status analyzing system comprising:
means for inputting data for a plurality of articles into a data base, the data comprising:
   (a) distribution attributes for each article, the distribution attributes including a plurality of checked locations along a path of distribution of the articles where each article is inspected for damage to use in determining wherein the path of distribution damage occurs; and
   (b) damage information for each article, the damage information including damage position information, in the form of planar two-dimensional position coordinates relative to a schematic representation of each article, which indicates a position of damage on each article at each checked location;
means for selecting from the inputted data one or more of the distribution attributes for the plurality of articles;
means for retrieving damage information indicative of damage concentrating at a particular position on the basis of the damaged position information on the articles satisfying the selected one or more distribution attributes;
means for classifying the damage information retrieved by the means for retrieving, according to said one or more selected distribution attributes; and
means for adding said damage information to a plan view of said article on the basis of the damaged position information on the articles satisfying the one or more distribution attributes and displaying the plan view with the damage information added thereto.

11. A damage status analyzing system according to claim 10, wherein said distribution attributes include an item indicative of time series of the distribution, and
said means for classifying classifies said retrieved damage information according to said time series.

12. A damage status analyzing system according to claim 10, wherein said distribution attributes include an item indicative of a type of the article, and
said means for classifying classifies said retrieved damage information according to said type of article.

13. A damage status analyzing system according to claim 10, wherein means for classifying classifies said retrieved damage information according to said checked locations where the article was inspected for damage.

14. A damage status analyzing system according to claim 10, wherein said distribution attributes include transportation information having at least one of a transportation means, a transportation route, and a transporter, and
said means for classifying classifies said retrieved damage information according to said transportation information.

15. A damage status analyzing system according to claim 10, wherein said damage information includes an item indicative of a type of damage, and
said means for classifying classifies the damage information according to said type of damage.

16. A damage status analyzing system according to claim 10, wherein said damage information includes an item indicative of a degree of damage, and
said means for classifying classifies the damage information according to said degree of damage.

17. A damage status analyzing system according to claim 10, wherein said means for displaying the plan view outputs said plan view of the article with said damage information added thereto and a spread sheet for said retrieved damage information.

18. A damage status analyzing system according to claim 10, wherein said means for displaying the plan view adds results of analysis associated with said particular position to said plan view of the article.

19. A computer readable recording medium having a program recorded therein, the program allowing a computer to execute the acts of:
inputting data for a plurality of articles into a data base, the data comprising:
   (a) distribution attributes for each article, the distribution attributes including a plurality of checked locations along a path of distribution of the articles where each article is checked for damage to use in determining where in the path of distribution damage occurs; and
   (b) damage information for each article, the damage information including damage position information, in the form of planar two-dimensional position coordinates relative to a schematic representation of each article, which is indicates a position of damage on each article at each checked location;
selecting from the inputted data one or more of the distribution attributes for the plurality of articles;
retrieving damage information indicative of damage concentrating at a particular position on the basis of the damaged position information on the articles satisfying the selected one or more distribution attributes;
classifying the damage information retrieved in the retrieving act according to said one or more selected distribution attributes; and
adding said damage information to a plan view of said article on the basis of the damaged position information on the articles satisfying the one or more distribution attributes and outputting the plan view with the damage information added thereto to a presentation section.

20. A program allowing a computer to execute the acts of:
inputting data for a plurality of articles into a data base, the data comprising:
   (a) distribution attributes for each article, the distribution attributes including a plurality of checked locations along a path of distribution of the articles where each article is checked for damage to use in determining where in the path of distribution damage occurs; and
   (b) damage information for each article, the damage information including damage position information, in the form of planar two-dimensional position coordinates relative to a schematic representation of each article, which indicates a position of damage on each article at each checked location;
selecting from the inputted data one or more of the distribution attributes for the plurality of articles;
retrieving damage information indicative of damage concentrating at a particular position on the basis of the damaged position information on the articles satisfying the selected one or more distribution attributes;
classifying the damage information retrieved in the retrieving act according to said one or more selected distribution attributes; and adding said damage information to a plan view of said article on the basis of the damaged position information on the articles satisfying the one or more distribution attributes and outputting the plan view with the damage information added thereto to a presentation section.

21. A damage status analyzing method comprising:

inputting data for a plurality of articles into a data base, the data comprising:
- (a) distribution attributes for each article, the distribution attributes including a plurality of checked locations along a path of distribution of the articles where each article is checked for damage to use in determining where in the path of distribution damage occurs; and
- (b) damage information for each article, the damage information including damage position information, in the form of planar two-dimensional position coordinates relative to a schematic representation of each article, which indicates a position of damage on each article at each checked location;

selecting from the inputted data one or more distribution attributes for the plurality of articles;

retrieving the damage position information for the articles satisfying the selected one or more distribution attributes; and displaying the location of the damage for all of the articles satisfying the selected one or more distribution attributes on a plan view of the article, the location of the damage being based on the retrieved damaged position information.

22. A damage status analyzing method according to claim 21, wherein said distribution attributes include an item indicative of time series of the distribution.

23. A damage status analyzing method according to claim 21, wherein said distribution attributes include an item indicative of a type of the article.

24. A damage status analyzing method according to claim 21, wherein said distribution attributes include transportation information having at least one of a transportation means, a transportation route, and a transporter.

25. A damage status analyzing method according to claim 21, wherein said damage information includes an item indicative of a type of damage.

26. A damage status analyzing method according to claim 21, wherein said damage information includes an item indicative of a degree of damage.

27. A damage status analyzing method according to claim 21, wherein in said display act outputs said plan view of the article with said damage position information added thereto and a spread sheet for said retrieved damage position information.

28. A damage status analyzing method according to claim 21, wherein in said display act adds results of analysis associated with said particular position to said plan view of the article.

* * * * *

UNITED STATES PATENT AND TRADEMARK OFFICE
CERTIFICATE OF CORRECTION

PATENT NO. : 6,862,543 B1
DATED : March 1, 2005
INVENTOR(S) : Toshifumi Tanimoto and Takashi Nakamura It is certified that error appears in the above-identified patent and that said Letters Patent is hereby corrected as shown below:

Column 1,
Line 14, change "image" to -- damage --.
Line 35, change "figures" to -- figured --.

Column 2,
Line 9, before "X and Y" remove "an".

Column 4,
Line 4, after "means" change "analyses" to -- analyzes --.

Column 5,
Line 19, after "analyzing" remove "a".

Column 6,
Line 48, after "analyzing" remove "a".

Column 7,
Line 51, after "indicated by" remove "an".
Line 67, change "were" to -- was --.

Column 9,
Line 21, change "B." to -- B, --.
Line 22, after "point" insert -- to --.
Line 43, after "pointed" insert -- to --.

Column 10,
Line 26, change "concentrating" to -- concentrated --.
Line 46, change "have" to -- has --.
Line 59, before "X and Y" remove "an".

Column 11,
Line 46, change "hundreds of card" to -- hundred cars --.

Column 12,
Line 3, change "were" to -- was --.
Line 36, remove "that".
Line 39, change "has" to -- is --.
Line 50, change "damage, " to -- damage and to --.
Line 56, change "conditions" to -- conditions, --.

UNITED STATES PATENT AND TRADEMARK OFFICE
CERTIFICATE OF CORRECTION

PATENT NO. : 6,862,543 B1
DATED : March 1, 2005
INVENTOR(S) : Toshifumi Tanimoto and Takashi Nakamura It is certified that error appears in the above-identified patent and that said Letters Patent is hereby corrected as shown below:

Column 13,
Line 34, change "virtually difficult" to -- very difficult, --.
Lines 34-35, change "burdens" to -- burdens, --.
Lines 36-37, change "analyzes and displays" to -- analyze and display --.
Line 59, change "notice" to -- notified --.
Line 62, change "notice" to -- notify --.

Column 14,
Line 32, change "ship" to -- car --.
Line 38, change "rod" to -- road --.

Column 16,
Line 49, change "starts" to -- stars --.

Column 17,
Line 35, change "key missing" to -- a missing key --.
Line 47, after "FIG. 25" insert -- is a --.

Column 18,
Line 43, change "S114" to -- S113 --.
Line 45, change "S115" to -- S117 --.

Column 22,
Line 27, before "indicates" remove "is".

Signed and Sealed this

Thirtieth Day of August, 2005

JON W. DUDAS
*Director of the United States Patent and Trademark Office*

UNITED STATES PATENT AND TRADEMARK OFFICE
CERTIFICATE OF CORRECTION

PATENT NO.        : 6,862,543 B1                                      Page 1 of 1
APPLICATION NO. : 10/169594
DATED             : March 1, 2005
INVENTOR(S)       : Tanimoto et al.

It is certified that error appears in the above-identified patent and that said Letters Patent is hereby corrected as shown below:

Title Page, item [22]
Column 1, PCT Filing Date, Change "Feb. 14, 2002" to --Sep. 29, 2000--

Signed and Sealed this

Fourth Day of November, 2008

JON W. DUDAS
*Director of the United States Patent and Trademark Office*